United States Patent
Brody

(10) Patent No.: US 9,394,060 B2
(45) Date of Patent: Jul. 19, 2016

(54) HELIPORT

(71) Applicant: XTI Air Transit, Inc.

(72) Inventor: David E. Brody, Greenwood Village, CO (US)

(73) Assignee: XTI AIR TRANSIT, INC., Greenwood Village, CO (US)

( * ) Notice: Subject to any disclaimer, the term of this patent is extended or adjusted under 35 U.S.C. 154(b) by 88 days.

(21) Appl. No.: 14/193,431

(22) Filed: Feb. 28, 2014

(65) Prior Publication Data

US 2014/0252168 A1    Sep. 11, 2014

Related U.S. Application Data

(60) Provisional application No. 61/773,544, filed on Mar. 6, 2013.

(51) Int. Cl.
| | |
|---|---|
| *E04H 6/44* | (2006.01) |
| *B64F 1/00* | (2006.01) |
| *E01F 3/00* | (2006.01) |
| *E04H 1/04* | (2006.01) |

(52) U.S. Cl.
CPC ... *B64F 1/00* (2013.01); *E01F 3/00* (2013.01); *E04H 1/04* (2013.01)

(58) Field of Classification Search
CPC ........... E04B 1/3404; E01F 3/00; E04H 6/44; E04H 1/04; B64F 1/007
USPC ............................. D25/5, 6; 52/236.4, 236.3
See application file for complete search history.

(56) References Cited

U.S. PATENT DOCUMENTS

| | | | | |
|---|---|---|---|---|
| 1,991,695 | A | * | 2/1935 | Petrovitch .................. 454/339 |
| 2,420,186 | A | * | 5/1947 | Miller et al. ................ 52/63 |
| 4,974,795 | A | * | 12/1990 | Christol .................. 244/114 R |
| 5,190,410 | A |   | 3/1993 | Nunley |
| 5,377,465 | A | * | 1/1995 | Kobori et al. ............ 52/236.3 |
| 5,426,907 | A |   | 6/1995 | Franklin |
| 8,297,014 | B2 |  | 10/2012 | Hanumantrao |

(Continued)

FOREIGN PATENT DOCUMENTS

| | | |
|---|---|---|
| CN | 201099995 Y | 8/2008 |
| CN | 101954959 A | 1/2011 |

(Continued)

OTHER PUBLICATIONS

Cooper, Kindra, This Enormous Collection of Towers in Mecca Will Become the World's Largest Hotel in 2017, Jun. 5, 2015, Architecture, International, p. 1-8.*

(Continued)

*Primary Examiner* — Elizabeth A Quast
(74) *Attorney, Agent, or Firm* — Perkins Coie LLP

(57) ABSTRACT

Embodiments of a heliport incorporate commercial and residential spaces with a plurality of helipads at multiple levels or floors, within a multi-story building. In various embodiments, the helipads cantilever out from the sides of the building or may simply span between oppositely faced sides of adjacent building structures. In some embodiments, the helipads extend outwardly from aircraft hangers and from commercial and residential spaces that extend into the building from the rear of the helipad. Rooftops associated with embodiments of the heliport include control tower facilities and additional helipads.

8 Claims, 21 Drawing Sheets

(56) References Cited

U.S. PATENT DOCUMENTS

2001/0052356 A1* 12/2001 Ross .............................. 135/124
2003/0101680 A1*  6/2003 Lee .............................. 52/745.2
2009/0113821 A1*  5/2009 Guo .............................. 52/173.1
2010/0287850 A1* 11/2010 Jadhav ........................ 52/169.1

FOREIGN PATENT DOCUMENTS

| DE | 20205396 U1 | 11/2002 | | |
|---|---|---|---|---|
| JP | 03-103574 | 4/1991 | | |
| JP | 03169983 A | * | 7/1991 | ............... E04H 6/44 |
| JP | 09-049210 | 2/1997 | | |
| JP | 11-117566 | 4/1999 | | |
| WO | WO-87/01754 A1 | 3/1987 | | |
| WO | WO-2009078032 A1 | 6/2009 | | |

OTHER PUBLICATIONS

Machine Translation of WO-87/01754-A1, date pulled Aug. 19, 2015, p. 1-2.*
Pickup, Oliver; Slippery when wet . . . Rafael Nadal and Roger Federer slide their way through a game of tennis on a floating court in Qatar; Jan. 4, 2011, http://www.dailymail.co.uk/travel/article-1343929/Rafael-Nadal-Roger-Federer-play-tennis-Qatars-floating-court.html, p. 1-12.*
Cross # Towers by BIG, May 3, 2012, http://www.dezeen.com/2012/05/03/cross-towers-by-big/, p. 1-14.*
Velo Towers by Asymptote, Jun. 14, 2012, http://www.dezeen.com/2012/06/14/velo-towers-by-asymptote-architecture/, p. 1-38.*
International Search Report and Written Opinion for International Patent Application No. PCT/US2014/019505, mailed May 27, 2014. 11 pages.

* cited by examiner

HELIPORT

CROSS-REFERENCE TO RELATED APPLICATIONS

The present application is a non-provisional of U.S. Provisional Patent Application Ser. No. 61/773,544, titled HELIPORT, filed Mar. 6, 2013, which is incorporated herein as if set out in full.

BACKGROUND

Helipads are areas or platforms designed for take-off and landing of helicopters and other vertical take-off and landing aircraft (collectively, "helicopters"). While such aircraft are able to operate on a variety of relatively flat surfaces, fabricated helipads and designated take-off and landing areas provide clearly marked hard surfaces away from obstacles where helicopters and other such aircraft can operate safely. Helipads have become common place in many commercial industries, including offshore oil platforms, news agencies, hospitals, large corporations, and municipalities, all of which frequently associate helipads with their main operating structures. For example, helipads are frequently located on large open areas of the surrounding grounds or rooftops of hospitals, fire stations, high rise commercial buildings, and the like. While far less common, helipads can also be located on rooftops of multi-story residential structures, such as condominiums.

Heliports are small facilities suitable for use only by helicopters and other vertical and take-off landing aircraft. Heliports typically contain one or more ground-level helipads and may have limited facilities such as fuel, lighting, wind direction indicators, and hangars. There are no heliports or other multi-level structures or buildings with helipads which are cantilevered outward from mid-level floors of the building. In many large cities around the world, heliports serve passengers that need to quickly move within the city or to outlying regions. Heliports have advantages over airports in that they can be situated closer to a town or the city center than an airport can be situated. To be sure, heliports require smaller operating areas due to the absence of runways needed for fixed-wing aircraft. The number of operating heliports and individual helipads, varies from city to city. People who use the heliports must usually shuttle to and from the heliport via car service or privately owned automobiles in order to reach interim or final destinations, such as businesses or homes. This can result in a significant delay in an individual's time, especially when the individual needs to make several trips each week by helicopter. Frequently, the limited number of heliports, individual helipads, and surrounding city congestion and traffic, limit the use and potential effectiveness of heliports for frequent users.

What is needed is a way to combine multi-story commercial and residential urban spaces with helipads and the full services of a major heliport which would otherwise be located solely at ground level, distant and unrelated to customers in such commercial and residential spaces.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

Heliports of the present technology are provided in a number of different embodiments and configurations. In at least one embodiment, a heliport includes a ground level that occupies a full footprint of the heliport. In some embodiments, the heliport includes a multi-segmented, or tiered, building structure. The tiers extend upwardly from the ground level and terminate at tier rooftops. The rooftops may include large, open areas that may include one or more helipads. At a rearward portion of the rooftops, hangars may extend rearwardly into adjacent portions of the building structure, including residential space and commercial or office space, such as a conference room. In some embodiments, the openings are hangars that are sufficiently sized to accommodate helicopters. It is contemplated that the hangars will include facilities for servicing and maintaining and storing aircraft. In various embodiments, at least one tiered segment is taller than other adjoining tiered segments. Accordingly, the taller tiered segment may include a rooftop having a control tower of different configurations. This tiered rooftop may also include a helipad, aircraft maintenance systems, and the like.

In various embodiments, the heliport may be provided with one or more platforms that extend outwardly from side portions of the heliport building. These side portions of the building may extend between the ground level portion and any tier rooftop portion. In some embodiments, the platforms cantilever outwardly from the side portions of the heliport to create a helipad. In particular embodiments, the platforms or helipads may simultaneously cantilever outwardly from a pair of adjacent side portions (a corner portion) of the building. Each platform may include one or more helipads. Hangars may be associated with each platform. Adjacent residential and/or commercial space may be associated with each platform. Within the hangars, service and maintenance of the aircraft may be performed and aircraft may be stored for any period of time.

In other embodiments, the heliport of the present technology is provided with a ground level and at least two separate towers that extend upwardly from the ground level. In some embodiments, one tower may be taller than the adjacent tower. The taller of the towers may include a rooftop having one or more helipads and a control tower. The open space between the two towers may be spanned by a plurality of platforms. Each of the platforms may include at least one helipad. The end portions of each of the platforms may extend outwardly from hangars that may be disposed in either or both of the opposing towers. A catwalk may extend between the opposing towers. In at least one embodiment, the catwalk may extend from one tower, at a level below its rooftop to the rooftop of the opposing tower.

In another embodiment a heliport includes a main tower that extends upwardly from a central portion of a ground level. The main tower extends between the ground level and a main tower rooftop. The main tower rooftop is positioned to be the highest portion of the heliport, which provides a desirable location for a control tower. A plurality of platforms and helipads may extend outwardly from the sides of the main tower. The helipad platforms cantilever outwardly from the sides of the main tower and are each provided with one or more helipads. Rearward end portions of each platform may be associated with hangars that are located within the perimeter of the main tower. Adjacent residential and/or commercial space may be associated with each platform and/or with each helipad. In various embodiments, the heliport may include one or more peripheral towers that extend upwardly from the ground level but are coupled with and extend outwardly from the side portions of the main tower. The peripheral towers may be provided in a variety of different heights. Peripheral tower rooftops may each be provided with one or more helipads. Each of the peripheral tower rooftops may terminate at their rearward portions with hangars, residential space, and/or commercial space, which is within the perimeter or outsider wall of the building.

Another embodiment of the heliport of the present technology is formed from at least two towers that extend upwardly from opposite end portions of a ground level portion. In some embodiments, a first tower and second tower are horizontally spaced-apart from one another and extend upwardly and at a slight angle away from one another. The first tower rooftop portion and second tower rooftop portion may include sufficient open space to include at least one or more helipads thereon. A central helipad platform is coupled at opposite end portions with the first tower and second tower, adjacent but below the first tower rooftop portion and second tower rooftop portion, spanning the open space between the towers. In various embodiments, a control tower extends upwardly from the central helipad platform. A lower surface of the central platform includes an observation platform. Embodiments of the heliport include a plurality of helipad platforms that cantilever outwardly from side portions of either or both of the first tower and second tower. Each of the platforms may include at least one helipad. Hangars and residential or commercial portions of the building may be associated with the platforms.

A further embodiment of the heliport of the present technology is formed from a plurality of horizontally spaced-apart towers that extend upwardly from a ground level portion. In at least one embodiment, a first tower and second tower are positioned to be spaced apart from, but in close proximity with, one another. A plurality of helipad platforms span the open space between the first tower and the second tower. In various embodiments, the heliport includes at least one additional tower that extends upwardly from the ground level portion. One or more platforms may be provided that cantilever outwardly from side portions of any of the towers. many of the platforms will include at least one helipad. Distal end portions of the platforms may extend freely from the side portions of the towers or include one or more supports that are coupled, at opposite end portions, with the side portions of the towers, beneath the platforms. Hangars and residential or commercial portions of the building may be associated with any of the helipad platforms. A control tower may be positioned to extend upwardly from the ground level portion of the heliport or from one of any of the tower rooftop portions.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. Therefore, the following detailed description is not to be taken in a limiting sense.

According to the present technology, heliports may be provided in a number of different embodiments and configurations. Various embodiments of the heliport incorporate commercial and residential spaces with a plurality of helipads, all within one or more multi-story buildings. Helipads, associated with such buildings, may be placed on conventional rooftop structures, adjacent ground areas or extend outwardly from the sides of the building, between the ground level and roof level portions. In different embodiments, the helipads may cantilever out from the sides of the building or may be positioned on platforms that extend between oppositely faced sides of adjacent building structures.

Figure 1:
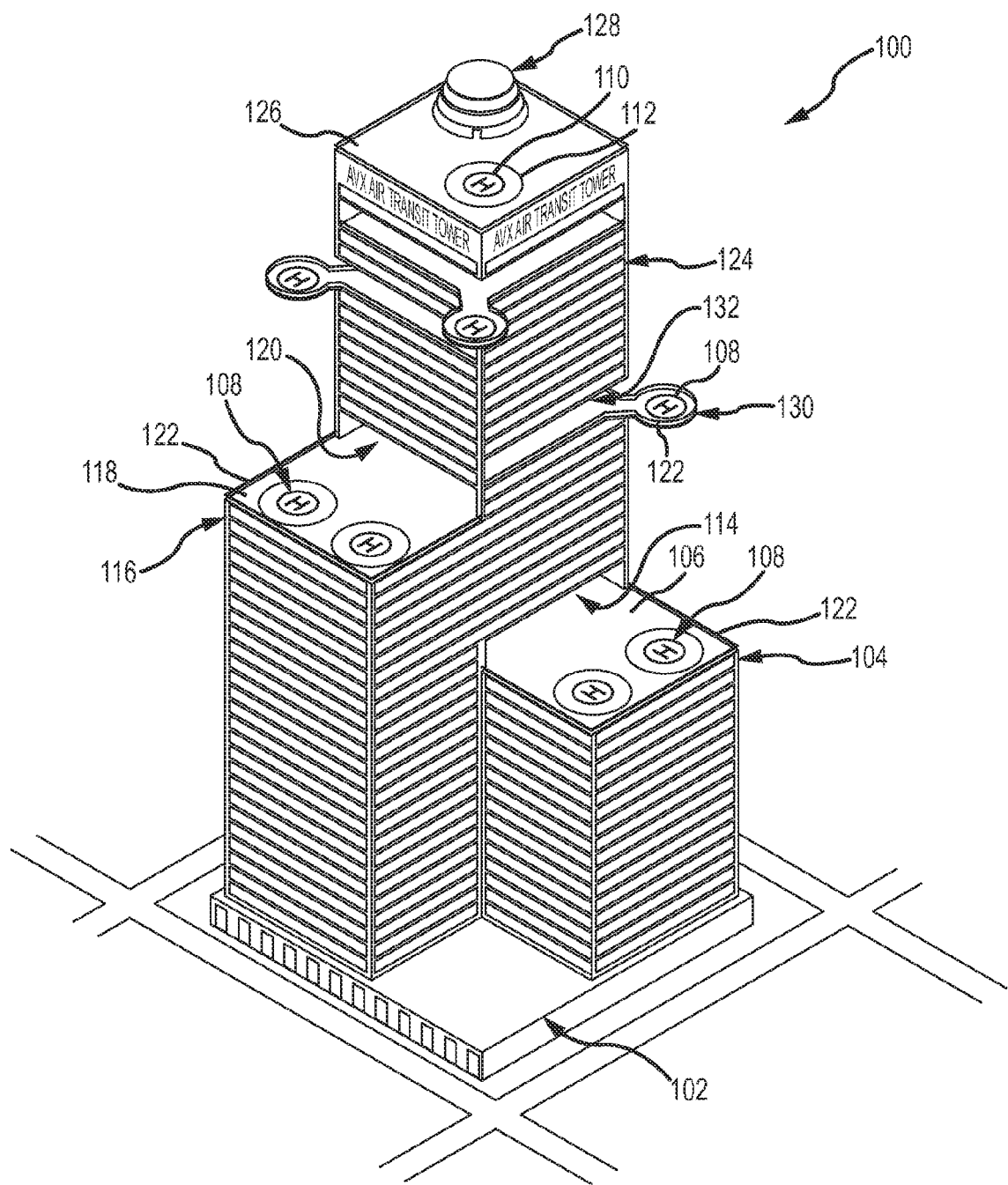
FIG. 1 depicts a perspective view of one embodiment of a heliport of the present technology.
Figure 2:
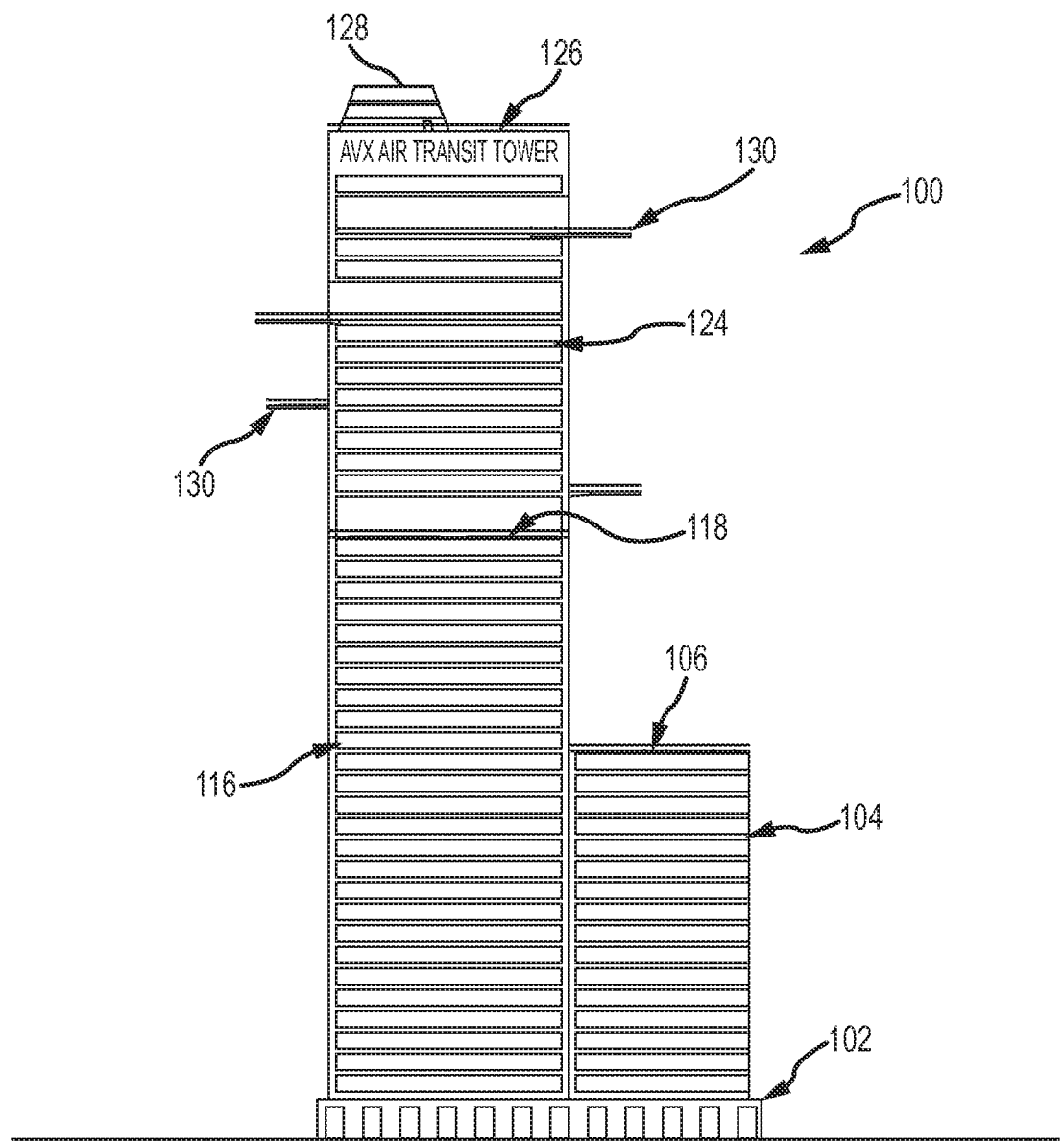
FIG. 2 depicts a front elevation view of the heliport depicted in FIG. 1.
Figure 3:
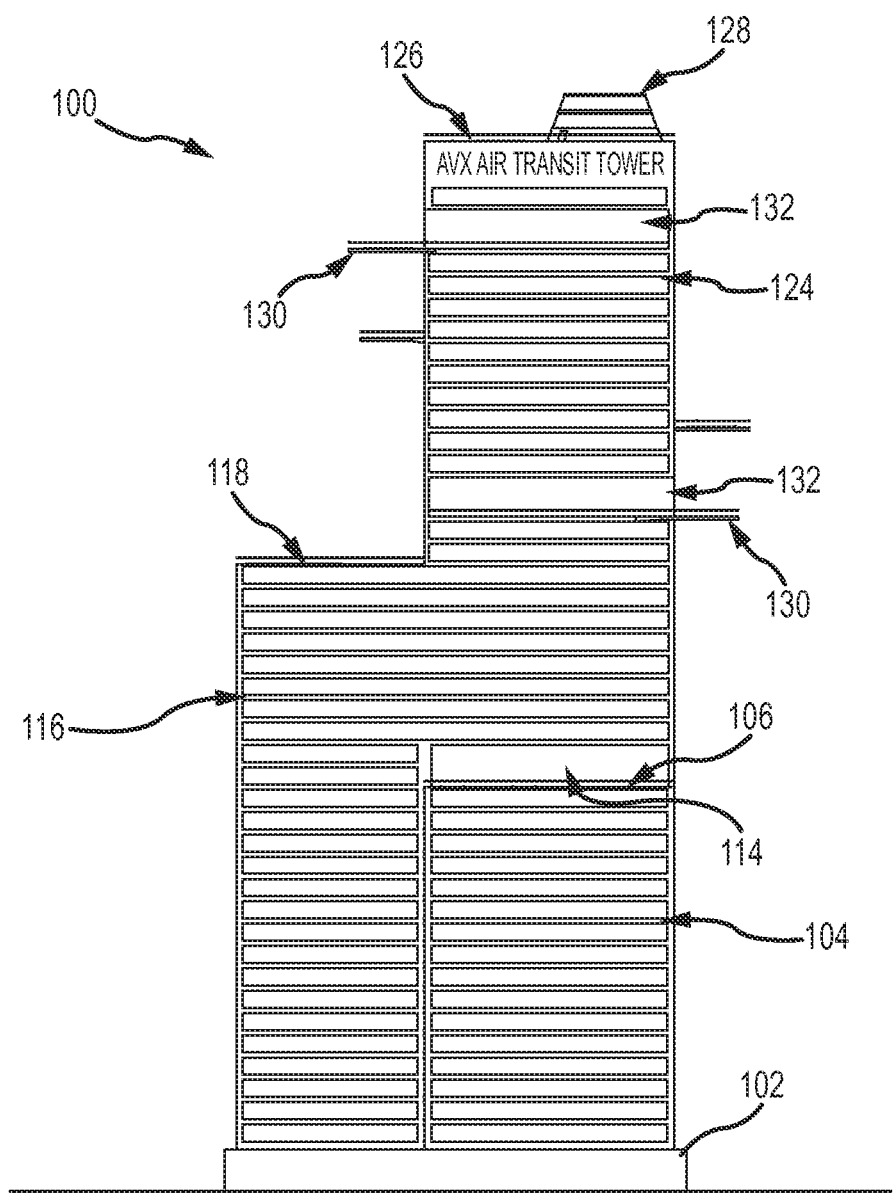
FIG. 3 depicts a side elevation view of the heliport depicted in FIG. 1.
Figure 4:
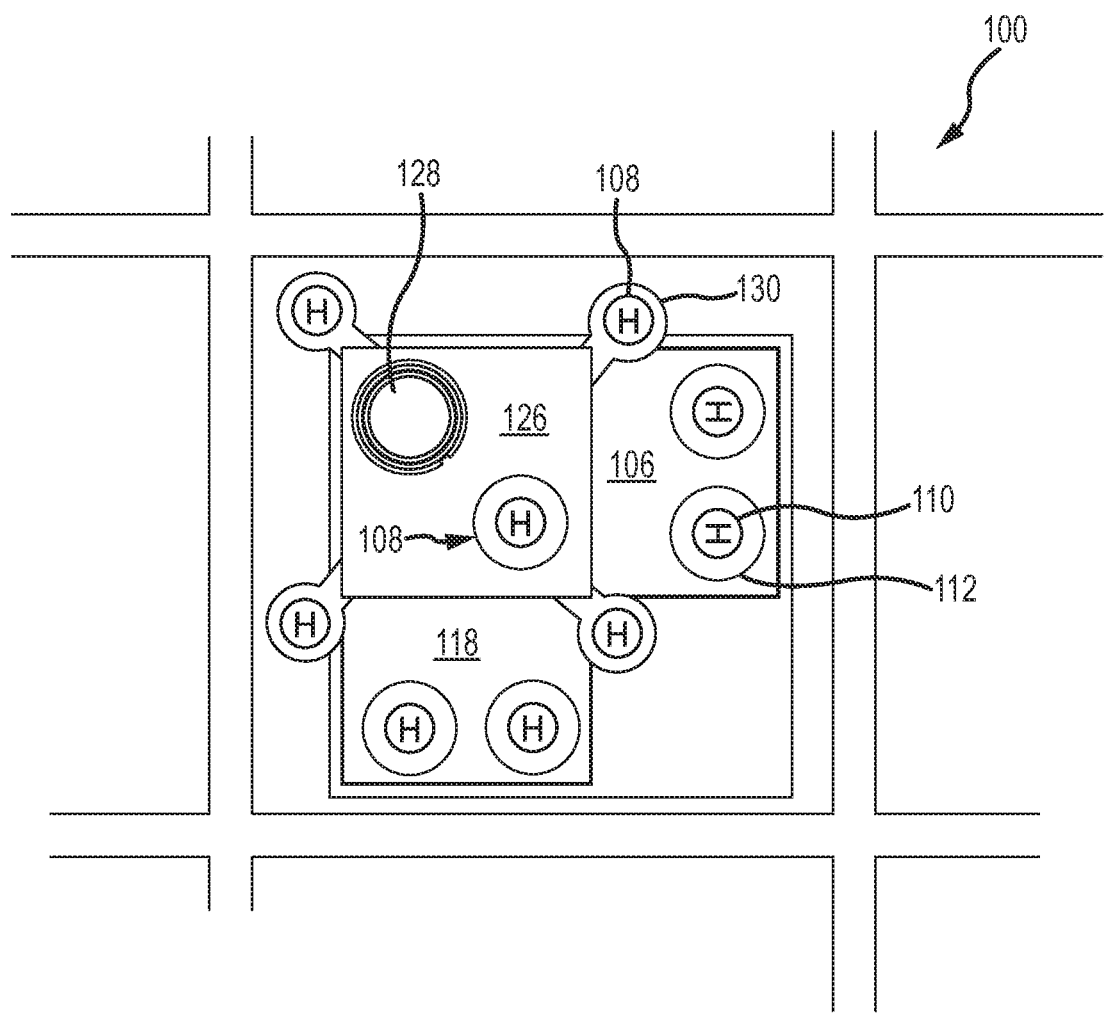
FIG. 4 depicts a top, plan view of the heliport depicted in FIG. 1.

With reference to FIGS. 1-4, a heliport 100 is configured from a multi-story building that is portioned into segments. A ground level portion 102 is depicted as occupying the full footprint of the heliport 100. While the ground level portion 102 is depicted as including only a single story, it is contemplated that the ground level portion 102 could occupy a plurality of stories and the configurations for the ground level portion 102 are endless. It is also contemplated that the ground level portion 102 may not terminate at actual ground level. In some embodiments, the ground level portion 102 may extend well below the ground surface and provide various subterranean levels that may be occupied by commercial, residential or utility spaces (such as parking garages), and the like. The ground level portion 102 may otherwise provide common services found within a ground level of a structure including commercial spaces for food, retail stores, reception, building security and recreational areas.

The heliport 100 continues to rise above the ground level portion 102. In the depicted embodiment, the heliport 100 includes a multi-segmented, or tiered, building structure that extends upwardly from the ground level portion 102. A first tiered segment 104 extends upwardly from the ground level portion 102 and terminates at a first tier rooftop portion 106. As with the aforedescribed ground level portion, any "rooftop level portion" herein may include one or more of the top stories of any building or tower, depending on its configuration. It will not, generally speaking, include only the upper roof surface of the buildings or towers. The first tier rooftop portion 106 may include a large, open area that may include one or more helipads 108, having one or more various helipad markings that aid in the landing and take-off of aircraft. In some embodiments, the helipads 108 are marked to include two or more concentric circles to designate the area occupied by each helipad 108. The innermost circle within each helipad 108 may be formed or otherwise designated using lights or other luminescent and non-luminescent markings, which may include paint and the like. This inner circle designates the touchdown and lift-off area (TLOF) 110. At least one additional circle may extend around the TLOF 110 and be marked with similar lights or other visual indicators. This second, exterior circle is known as the final approach and take-off area (FATO) 112. Lights used to indicate the TLOF 110 and FATO 112 may be elevated or inset. It is contemplated that the lights may be white, as recommended by the International Civil Aviation Organization and Federal Aviation Administration. It is also contemplated that yellow or amber, which was the former standard and is still preferred in many locations, may be used in place of or in conjunction with white lights. However, it is understood that there is a great deal of variance in color depending on the owner, jurisdiction and geographic location of the heliport. All the lights may be the traditional incandescent variety; use of light-emitting diodes with brightness control is preferred. The TLOF and FATO lights may also be marked by surface floodlights (not depicted). Lighted wind cones (not depicted) may also be located proximal the helipads 108, as such devices are required in most jurisdictions. Rows of lead-in lights (not depicted) may also mark helipads 108 to indicate a preferred direction of approach, depending on the orientation of the heliport 100 and adjacent structures. Visual slope guidance systems (such as HAPI, PAPI, etc.) may also be associated with the helipads 108 as deemed desirable or necessary according to the use of the helipads 108 and mark their location. Radio control of all helipad lighting by the pilot via an automated ground-based controller may also be associated with the helipads 108.

At a top rearward portion of the first tier rooftop portion 106, a hangar 114 may extend rearwardly from the first tiered segment 104 into adjacent portions of the building structure. In some embodiments, it is contemplated that the hangar 114 will include an opening that is sufficiently sized to accommodate various types of helicopters. In particular, this opening may be at least two stories tall and may be left open or selectively closable using one of various retractable or otherwise closable bay doors. It is contemplated that the hangar 114 will include facilities for servicing, maintaining and storing aircraft. Such facilities may include refueling services, where the fuel is either stored locally to the hangar or delivered to the hangar by pipeline from a storage tank facility offsite. Basic and advanced aviation mechanics facilities are also contemplated for continued upkeep and service of aircraft within the hangar 114. Open storage areas within the hangar 114 may be provided for temporary or a long term storage of one or more aircraft that do not need to be on a "ready status" on the helipads 108. Other equipment, such as aircraft relocation systems, such as helicarriers, light tow carts, universal tow carts, and various sizes of aircraft tugs and tow tractors, may be stored within the hangar 114 for locating the aircraft to and from the helipads 108 and hangar 114. Owners, tenants and other individuals in the building may have access from each floor of the building to the hangars on the same or other floors, and may have access from each floor directly to the helipad. Each floor may be used for one purpose or multiple purposes, including residential, commercial, retail, helipad uses.

With continued reference to FIGS. 1-4, the heliport 100 may include a second tiered segment 116 that extends upwardly from the ground level portion 102 and terminates at a second tier rooftop portion 118. In some embodiments, such as depicted in FIGS. 1-4, the second tiered segment 116 may extend higher than the first tiered segment 104, such that the second tier rooftop portion 118 is disposed at a higher altitude than the first tier rooftop portion 106. The second tiered segment 116 may be disposed to extend transversely with respect to the first tiered segment 104, such that they extend outwardly at an angle from a common rearward portion. As with the first tiered segment 104, the second tiered segment 116 may include a large open area on its second tier rooftop portion 118 to accommodate one or more helipads 108. The helipads 108 may be configured and accessorized as described previously. Similarly, a hangar 120 may be associated with a rearward portion of the second tier rooftop portion 118. The hangar 120 may be structured and otherwise accessorized in a manner similar to that described with respect to hangar 114. It is contemplated that facing the first tiered segment 104 and second tiered segment 116 in different directions will dispose their respective helipads 108 in locations that are sufficiently remote from one another such that aircraft may simultaneously land and take off without significant interference. Moreover, the alternating altitudes for the first tier rooftop portion 106 and second tier rooftop portion 118, in different angular orientations with respect to one another, may also provide a benefit during alternating wind and weather conditions for the landing and takeoff of aircraft. A railing 122 may be associated with the perimeter either or both of the first tier rooftop portion 106 and second tier rooftop portion 118 to provide necessary safety for individuals and crew who are operating near the perimeter of either rooftop.

With continued reference to FIGS. 1-4, the heliport 100 may be provided with a third tiered segment 124 that extends upwardly from the ground level portion 102 and terminates at a third tiered rooftop portion 126. As can be seen from the figures, the third tiered segment 124 is taller than the first tiered segment 104 or the second tiered segment 116. Accordingly, the third tiered rooftop portion 126 is disposed at an altitude higher than those of the first tier rooftop portion 106 and second tier rooftop portion 118. The third tiered segment 124 extends upwardly from a central core that passes through each of the first tiered segment 104, second tiered segment 116 and a portion of the ground level portion 102. Due to the fact that the third tiered rooftop portion 126 is the highest platform of the heliport 100, a control tower 128 may be associated with the third tiered rooftop portion 126. In various embodiments, the control tower 128 may be provided in a plurality of different configurations that extend upwardly from the third tiered rooftop portion 126. In the depicted embodiments, the control tower 128 has a generally circular perimeter with windows that afford control tower personnel with a 360 degree view of the skyline surrounding the heliport 100. It is contemplated that the control tower 128 may be provided as a single story structure or may extend several stories above the surface of the third tiered rooftop portion 126, as the heliport 100 and its position with respect to adjacent manmade and natural structures dictates. It is contemplated that systems associated within the control tower 128 will include radar displays and live monitor displays of each helipad available for Local Control or Air Control, Ground Control, and Flight Data/Clearance Delivery. Regardless of particular configuration within the control tower 128, it is contemplated that sufficient facilities will be provided to coordinate with local and regional air control facilities and other airports, and heliports. The third tiered rooftop portion 126 may also include a helipad 108, as described previously. Similarly, a railing 122 may also be disposed at the perimeter of the third tier rooftop portion 126 for the safety of individuals operating on the third tier rooftop portion 126.

With further reference to FIGS. 1-4, the heliport 100 may be provided with one or more platforms 130 that cantilever outwardly from side portions of the heliport building. These side portions of the building may extend between the ground level portion 102 and the third tier rooftop portion 126. However, the side portions may also simply extend between either or both of the first tier rooftop portion 106 or second tier rooftop portion 118 and the third tier rooftop portion 126. Regardless of where the lower portion of such building side begins, the side portions will terminate at one of either the first tier rooftop portion 106, second tier rooftop portion 118, or third tier rooftop portion 126. In some embodiments, such as depicted in FIGS. 1-4, the platforms 130 cantilever outwardly from the side portions of the heliport 100. In particular embodiments, such as depicted, the platforms may cantilever outwardly from a pair of adjoining side portions. In this manner, the "side portion" may include a pair of side portions and/or a corner portion of the building. In this manner, the distal end portions of the platforms 130 extend away from the side surfaces of the heliport 100 at an angle. This limits direct visual or auditory engagement with activity on the platforms 130 with the sides of the heliport 100. It is contemplated that each platform 130 will include at least one helipad 108, as described previously herein. A walkway having a width of at least 20 feet may extend outwardly from the FATO 112 of each helipad 108 to allow individuals and equipment to move around the helipad 108. A railing 122 may extend upwardly from the edge portions of the platform 130 and extend around the entire peripheral edge of the platform 130. Hangars 132 and residential or commercial space or units 132 may be associated with each platform 130. The hangars 132 may be outfitted similar to hangars 114 and 120. In this manner, aircraft may be moved from the platform 130 into the hangar 132 and returned for takeoff. Within the hangars, service and maintenance of the aircraft may be performed and aircraft may be stored for any period of time. The hangars 132 may also be provided to have a ceiling height that is multiple stories high and may provide open sides that may be selectively closable with at least one retractable cover, such as retractable doors, windows, and the like. Portions of the same story or floor of the hangar, and/or floors above or below the hangar may be residential or commercial space or units, with direct access to the hangar.

Figure 5:
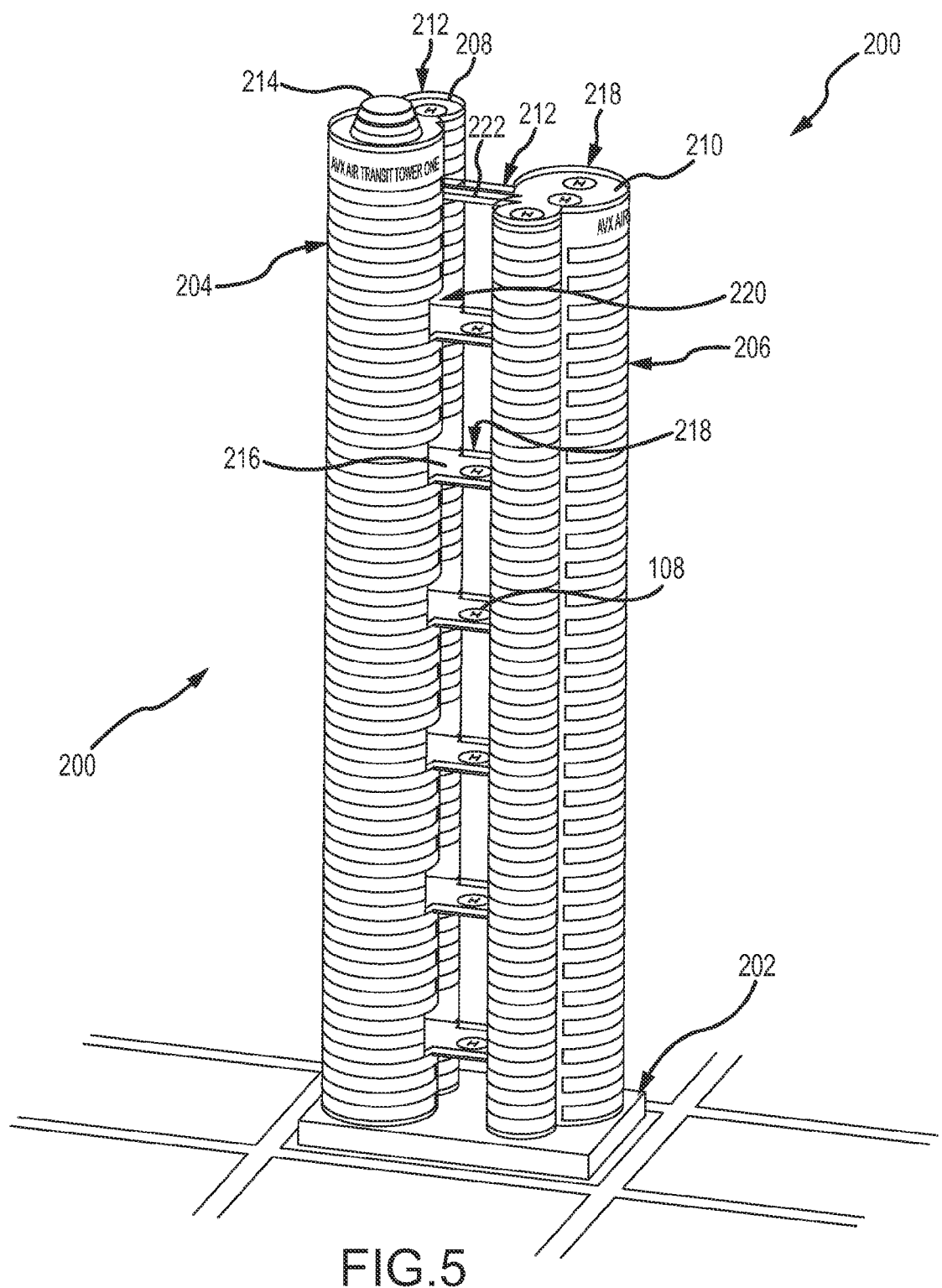
FIG. 5 depicts a perspective view of another embodiment of a heliport of the present technology.
Figure 6:
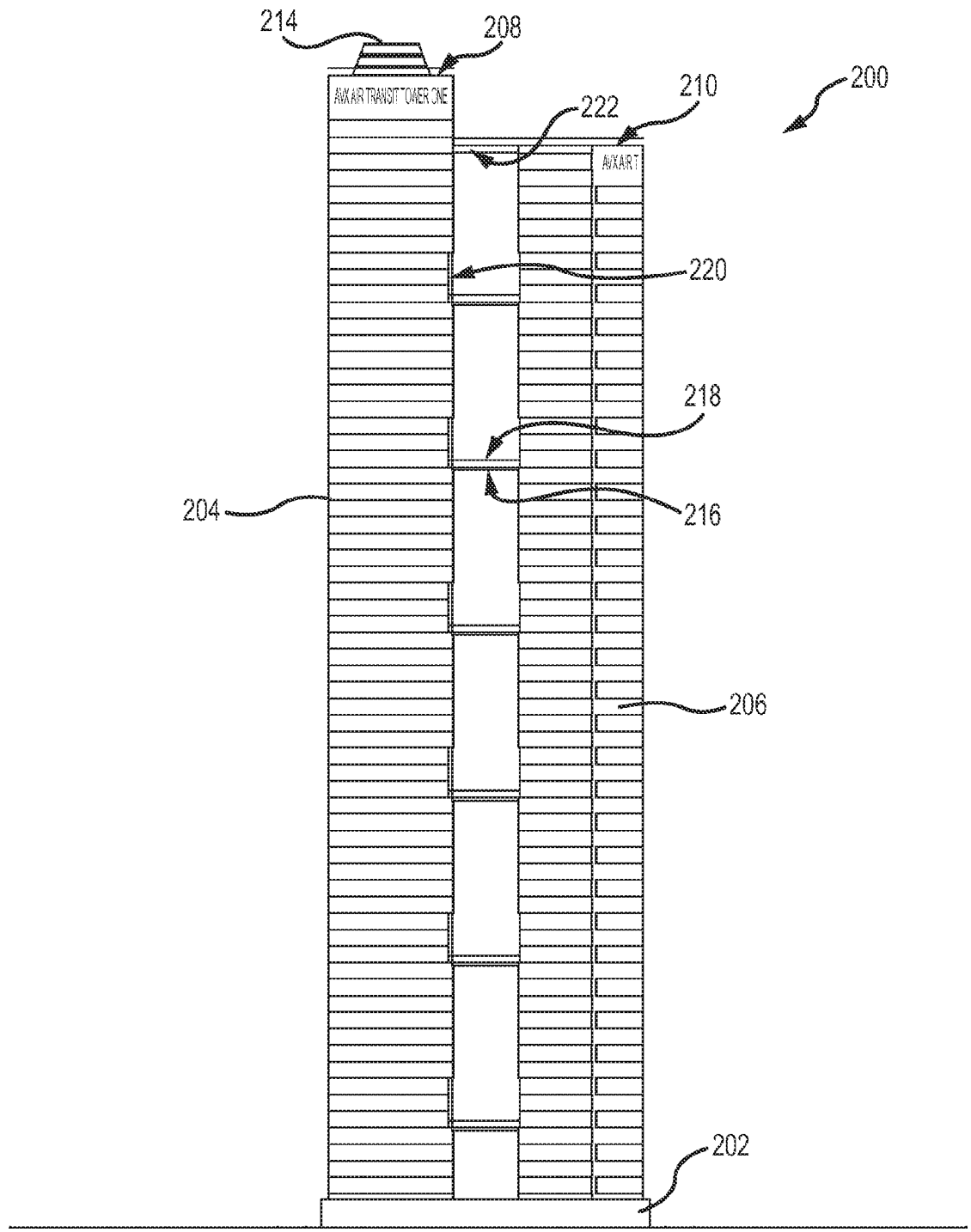
FIG. 6 depicts a front elevation view of the heliport depicted in FIG. 5.
Figure 7:
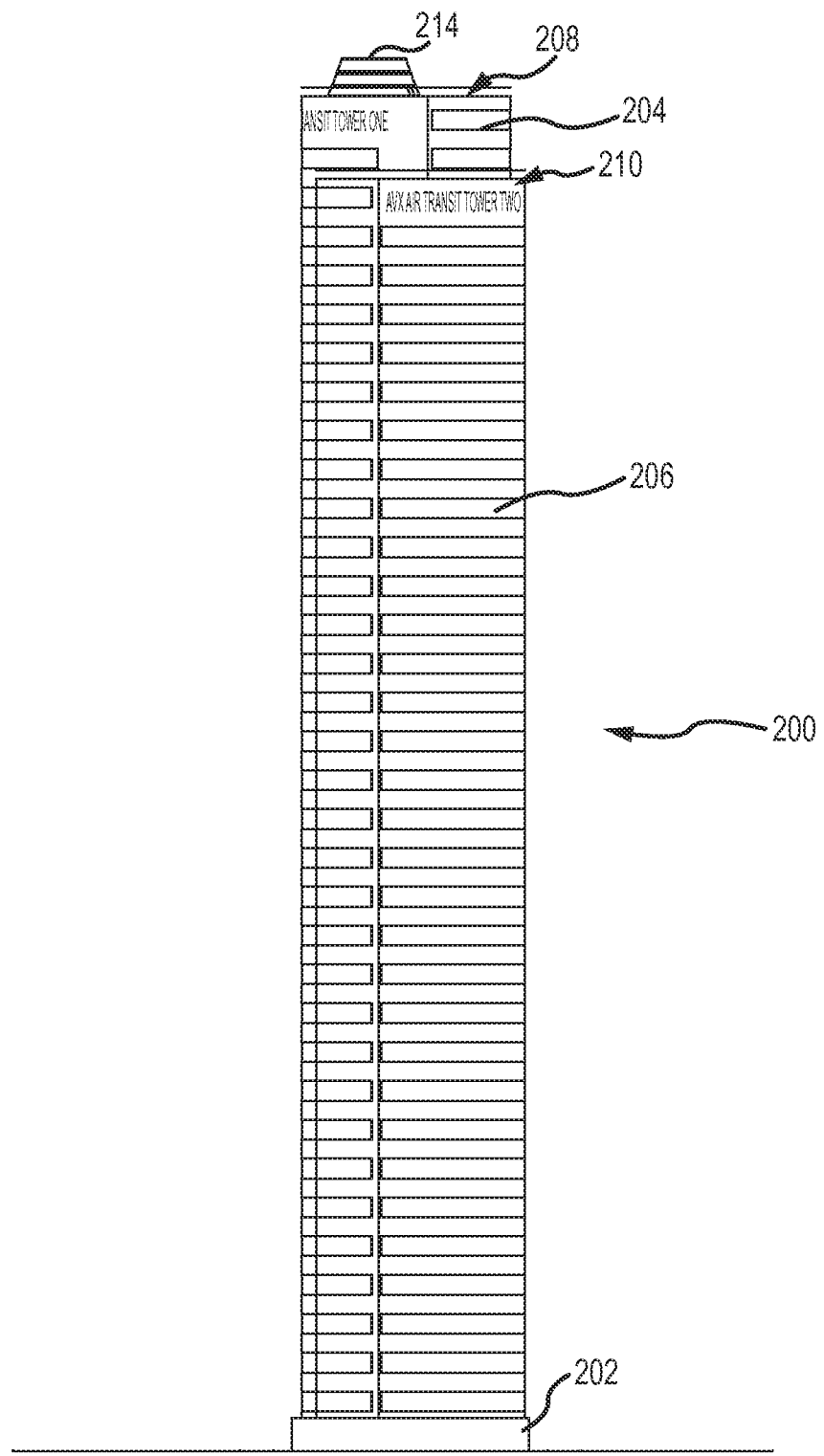
FIG. 7 depicts a side elevation view of the heliport depicted in FIG. 5.
Figure 8:
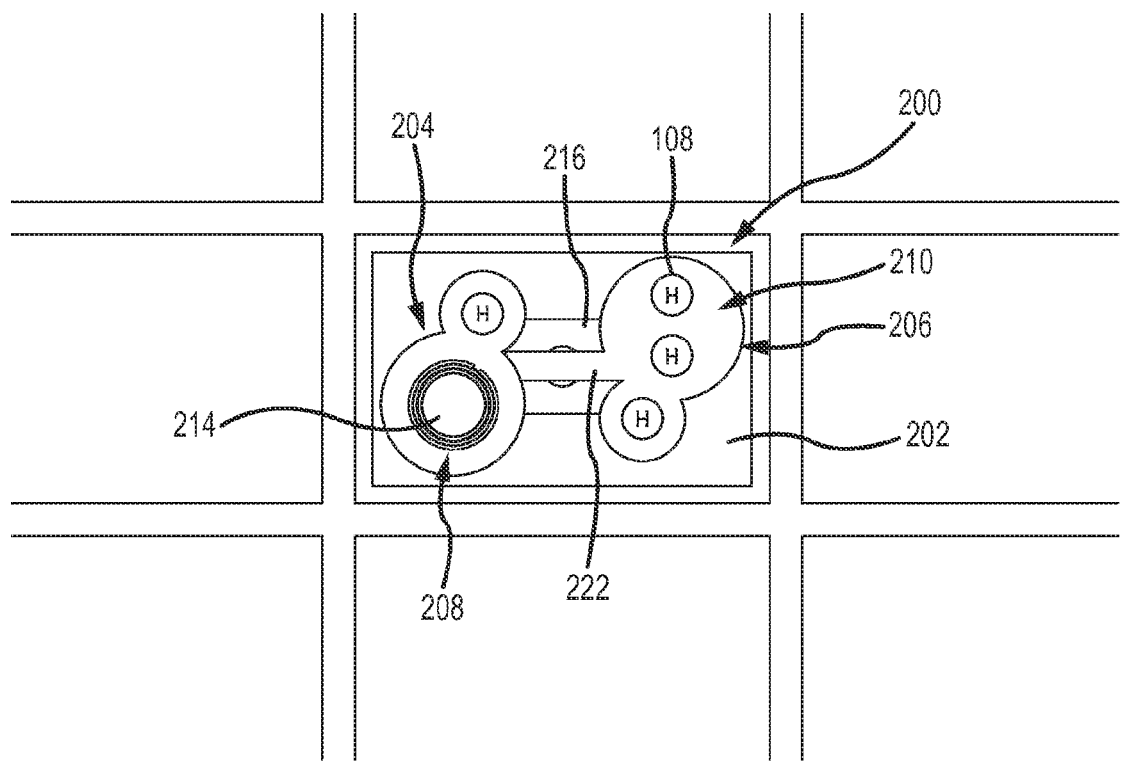
FIG. 8 depicts a top, plan view of the heliport depicted in FIG. 5.

With reference to FIGS. 5-8, another embodiment of the heliport of the present technology is depicted. Specifically, a heliport 200 is provided with a ground level portion 202 that may be provided in a manner similar to that described with respect to ground level portion 102. Accordingly, the ground level portion 202 may extend above or below the ground surface, nearly any number of desired stories according to the desired usage. It is contemplated that the ground level portion 202 may be used for commercial or residential operations. Other uses may include security, underground parking, and general reception areas.

The heliport 200 may be formed from at least two separate towers that extend upwardly from the ground level portion 202. In the depicted embodiment, a first tower 204 extends approximately 70 stories above the ground level portion 202. It is contemplated that the first tower 204 may be provided to have any number of stories according to the desired scope and usage of the heliport 200. A second tower 206 is positioned on an opposite end portion of the ground level portion 202 and extends upwardly therefrom. In the depicted embodiments, the second tower extends approximately 65 stories above the ground level portion 202. Accordingly, the first tower 204 extends approximately five stories above the upper most level of the second tower 206. The first tower 204 and second tower 206 are positioned to be spaced apart from one another. The open space between the two towers may be provided according to the desired needs of the heliport 200. However, in the depicted example, the space between the towers is provided to be approximately 120 to 150 feet.

The first tower 204 is provided with a first tower rooftop portion 208. Similarly, the second tower 202 is provided with a second tower rooftop portion 210. It is contemplated that the first tower rooftop portion 208 and second tower rooftop portion 210 will include sufficient open space to include at least one or more helipads 108 thereon. The helipads 108 on either or both of the first tower rooftop portion 208 and second tower rooftop portion 210 may be provided in a manner similar to that described with respect to the helipads 108 in the heliport 100. Similarly, a railing 212 may extend around the perimeter of both the first tower rooftop portion 208 and second tower rooftop portion 210 to provide safety for personnel conducting operations thereon. In view of the height advantage of the first tower rooftop portion 208, a control tower 214 may be provided thereon. It is contemplated that the control tower 214 will perform similar functions as that described for the control tower 128. Accordingly, the control tower 214 will be provided with similar systems and equipment for monitoring heliport control, ground control and local control or air control. As described with respect to the control tower 128, the control tower 214 may be provided in many sizes and configurations. However, the circular configuration depicted provides 360 degree views and provides a sufficient height above the first tower rooftop portion 208 to provide the needed aircraft control services.

With further reference to FIGS. 5-8, the heliport 200 may be provided with a plurality of platforms 216 that span the open space between the first tower 204 and the second tower 206. Accordingly, each of the platforms 216 that extend between the first tower 204 and second tower 206 will have a length of approximately 120 to 150 feet. Each of the platforms 216 will have a width of approximately 60-70 feet, depending upon the intended use of the heliport 200. Each of the platforms 216 will include at least one helipad 208 that are structured and accessorized according to the helipads 108 described previously herein. A railing 218 may extend along the side edges of each of the platforms 216 to ensure safety for personnel operating thereon.

The end portions of each of the platforms 216 may extend outwardly from hangars 220, which may be disposed in either or both of the first tower 204 or second tower 206. As described with respect to the hangars associated with heliport 100, the hangars 220 associated with the heliport 200 may include any number of aircraft support, maintenance, servicing, or storing services. The hangars 220 may be used for storage for any period of time as well as maintenance and the like. The openings to the hangars 220 may be provided to be several stories in height and may be left open or selectively closable by retractable doors or other similar structures, and may be combined with residential or commercial occupied units which are adjacent to the hangars and to the helipads, or on floors above or below the hangars or helipads. A catwalk 222 may extend between the first tower 204 and second tower 206. In the embodiment depicted, the catwalk 222 extends from the first tower 204 to the second tower rooftop portion 210. In this manner, access is easily granted to the helipads 108 disposed atop the second tower rooftop portion 210.

Figure 9:
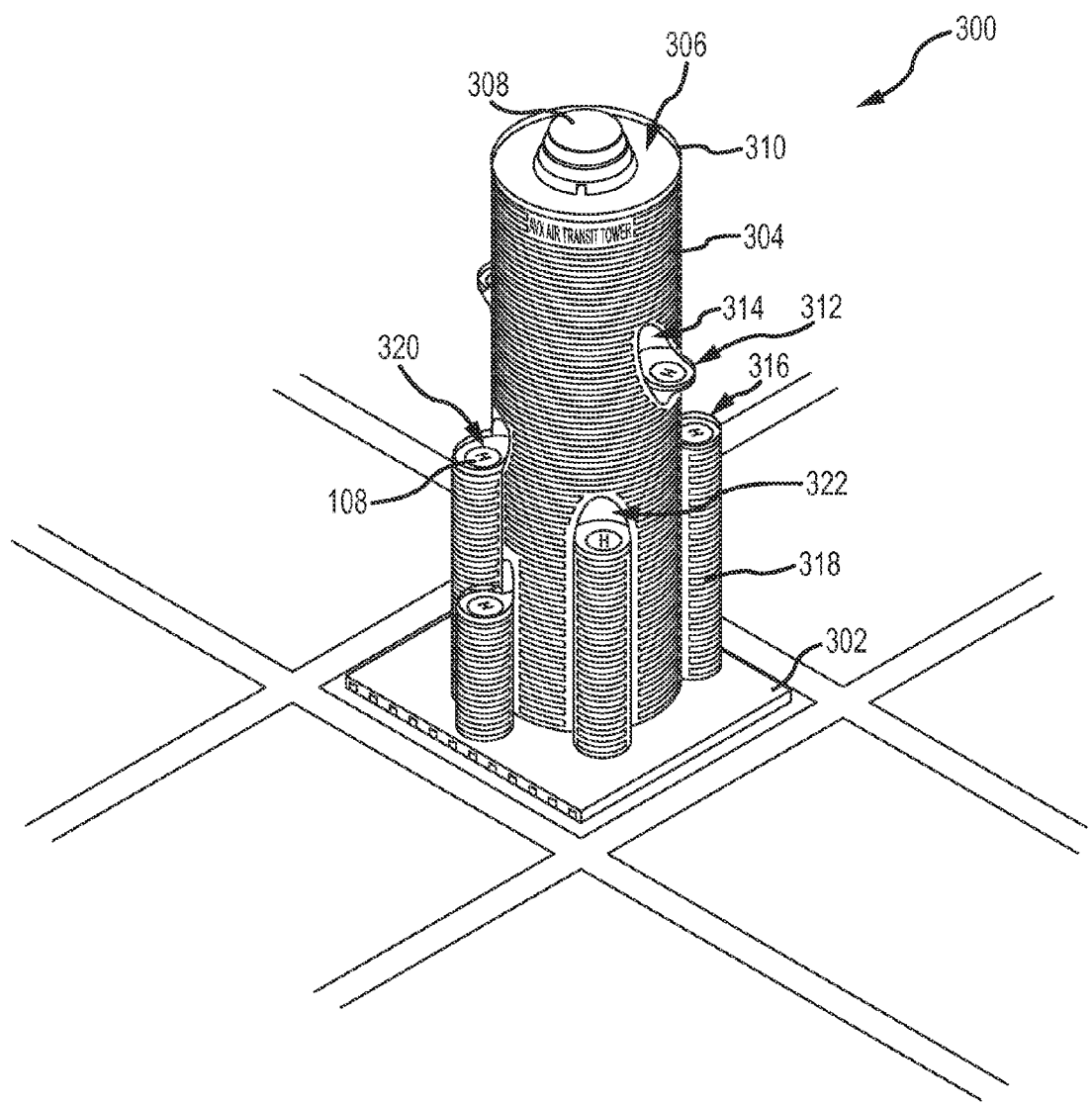
FIG. 9 depicts a perspective view of a further embodiment of a heliport of the present technology.
Figure 10:
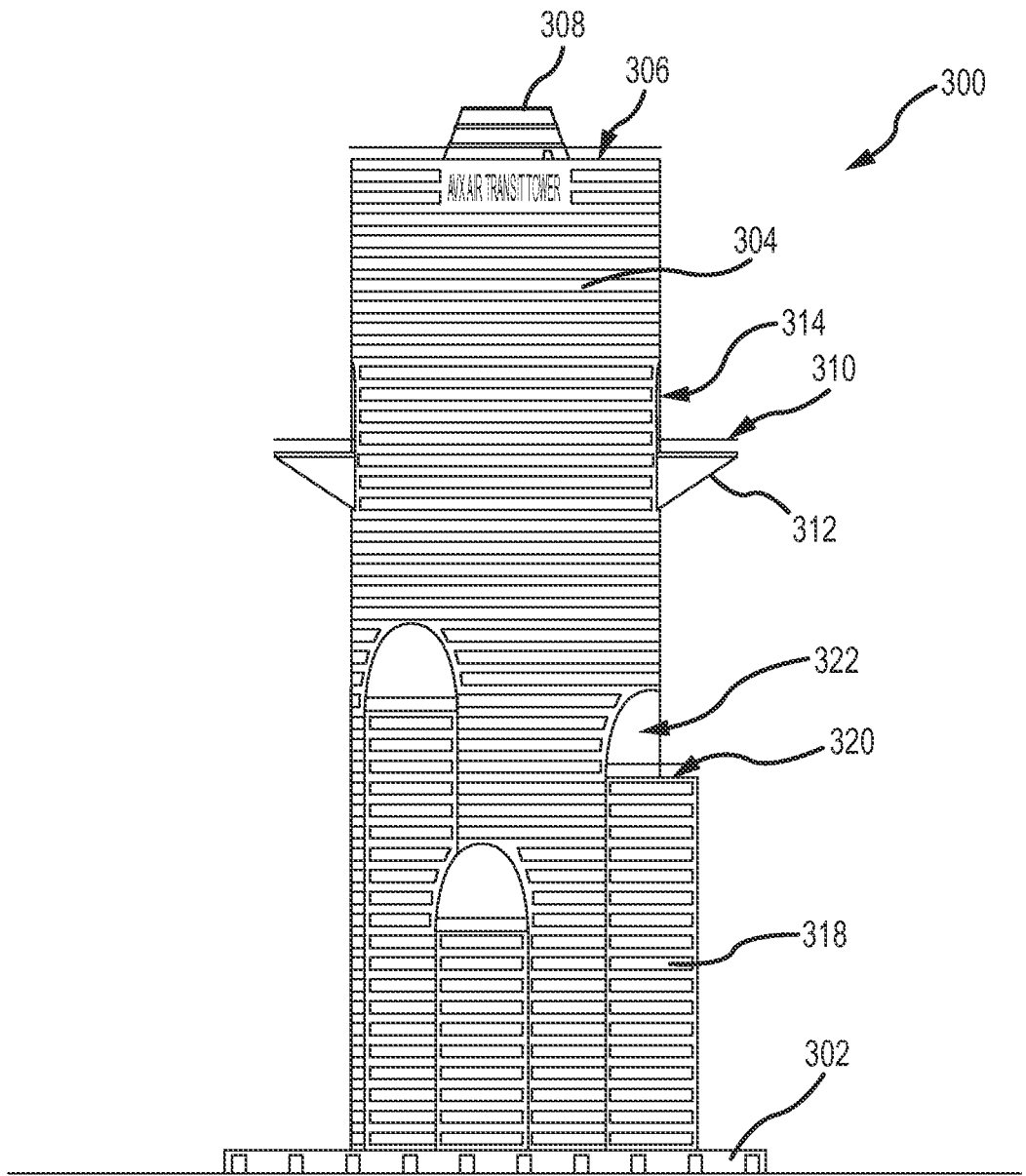
FIG. 10 depicts a front elevation view of the heliport depicted in FIG. 9.
Figure 11:
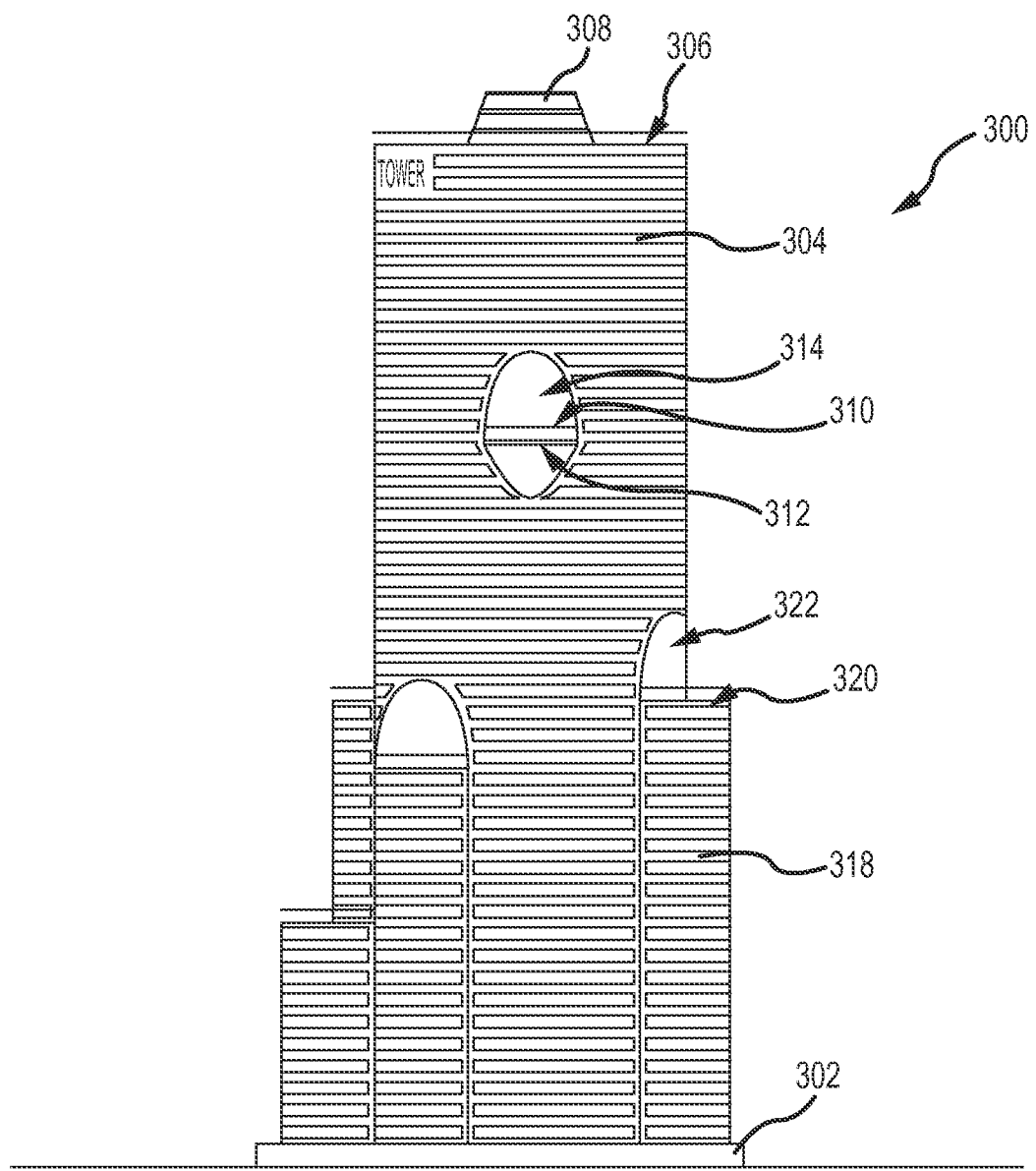
FIG. 11 depicts a side elevation view of the heliport depicted in FIG. 9.
Figure 12:
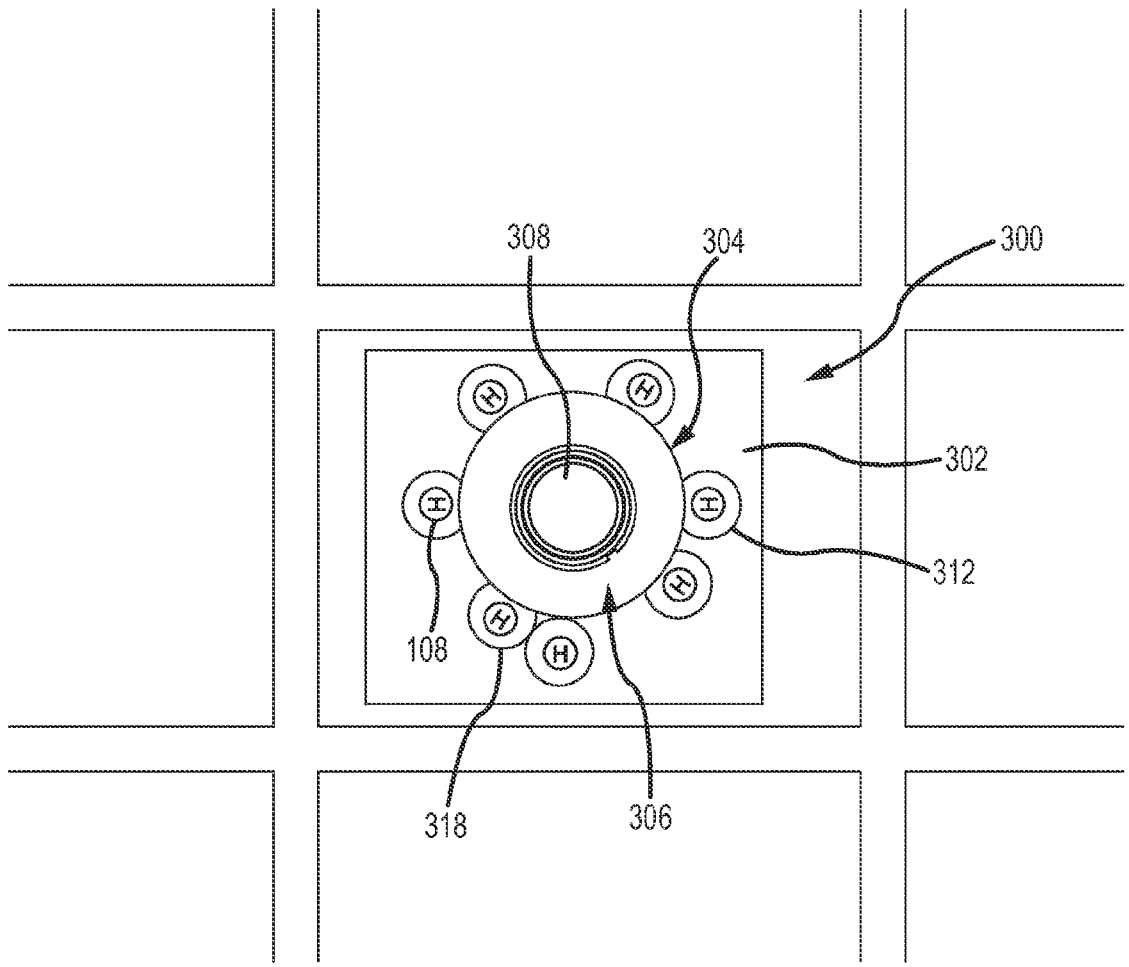
FIG. 12 depicts a top, plan view of the heliport depicted in FIG. 9.

With regard to FIGS. 9-12, a third embodiment of the present heliport technology is depicted. Specifically, a heliport 300 is depicted as extending upwardly from a ground level portion 302. The ground level portion 302 may be provided in the manner similar to that described with respect to ground level portions 102 and 202. Accordingly, the ground level portion 302 may extend several stories above or below a ground surface to provide the commercial, residential and utility spaces so desired. A main tower 304 extends upwardly from a central portion of the ground level portion 302. While the main tower 304 is depicted as having a circular peripheral edge, the main tower 304 may be provided to have nearly any shape desired, according to the intended use of the heliport 300. The main tower 304 extends between the ground level portion 302 and a main tower rooftop portion 306. The main tower rooftop portion 306 is positioned to be the highest portion of the heliport 300. Accordingly, the main tower rooftop portion 306 provides a desirable location for the control tower 308. The control tower 308 may be provided in a manner similar to that described previously for control tower 128 and 214. However, it is contemplated that sufficient systems and facilities will be associated with control tower 308 so that it may provide sufficient heliport control, ground control, and local control or air control. The control tower 308 will also be provided with sufficient systems to communicate effectively with regional and local air traffic control facilities. The peripheral edge of the main tower rooftop portion 306 may be provided with a railing 310 that extends upwardly from the surface thereof to protect personnel conducting operations about the rooftop.

A plurality of platforms 312 may extend outwardly from the sides of the main tower 304. Specifically, the platforms 312 cantilever outwardly from the sides of the main tower 304. As described previously with respect to the platforms 130, associated with the heliport 100, the platforms 312 may each be provided with one or more helipads 108. These helipads 108 will be configured and accessorized, as described previously, with respect to the heliport 100 and heliport 200. Rearward end portions of each platform 312 may be associated with hangars 314 that extend into the main tower 304. The hangars 314 may be provided to have openings of several stories in height that may be selectively closable by retractable doors or other similar structures, and may be combined with residential or commercial occupied units which are adjacent to the hangars and to the helipads, or on floors above or below the hangars or helipads. However, it is also contemplated that one or more of the hangars 314 may be left in an open environment condition. The hangars 314 will be provided with facilities as described with respect to the hangars associated with heliports 100 and 200. Specifically, the hangars 314 may provide service, maintenance and storage facilities needed for aircraft that may use the helipads 108. Railings may extend outwardly from the openings for the hangars 314 to extend around the peripheral edge portions of the platforms 312 to provide safety for personnel conducting operations adjacent to the helipads 108.

In various embodiments, such as depicted, the heliport 300 may include one or more peripheral towers 318 that extends upwardly from the ground level portion 302 but are coupled with and extend outwardly from the side portions of the main tower 304. As depicted, the peripheral towers 318 may be provided in a variety of different heights as they extend upwardly from the ground level portion 302. Each of the peripheral towers 318 will be provided with a peripheral tower rooftop portion 320. The peripheral tower rooftop portions 320 may each be provided with one or more helipads 108, as described previously. Moreover, each of the peripheral tower rooftop portions 320 may terminate at their rearward portions with hangars 322 which may be structured and provided as described with respect to the hangars 314.

Figure 13:
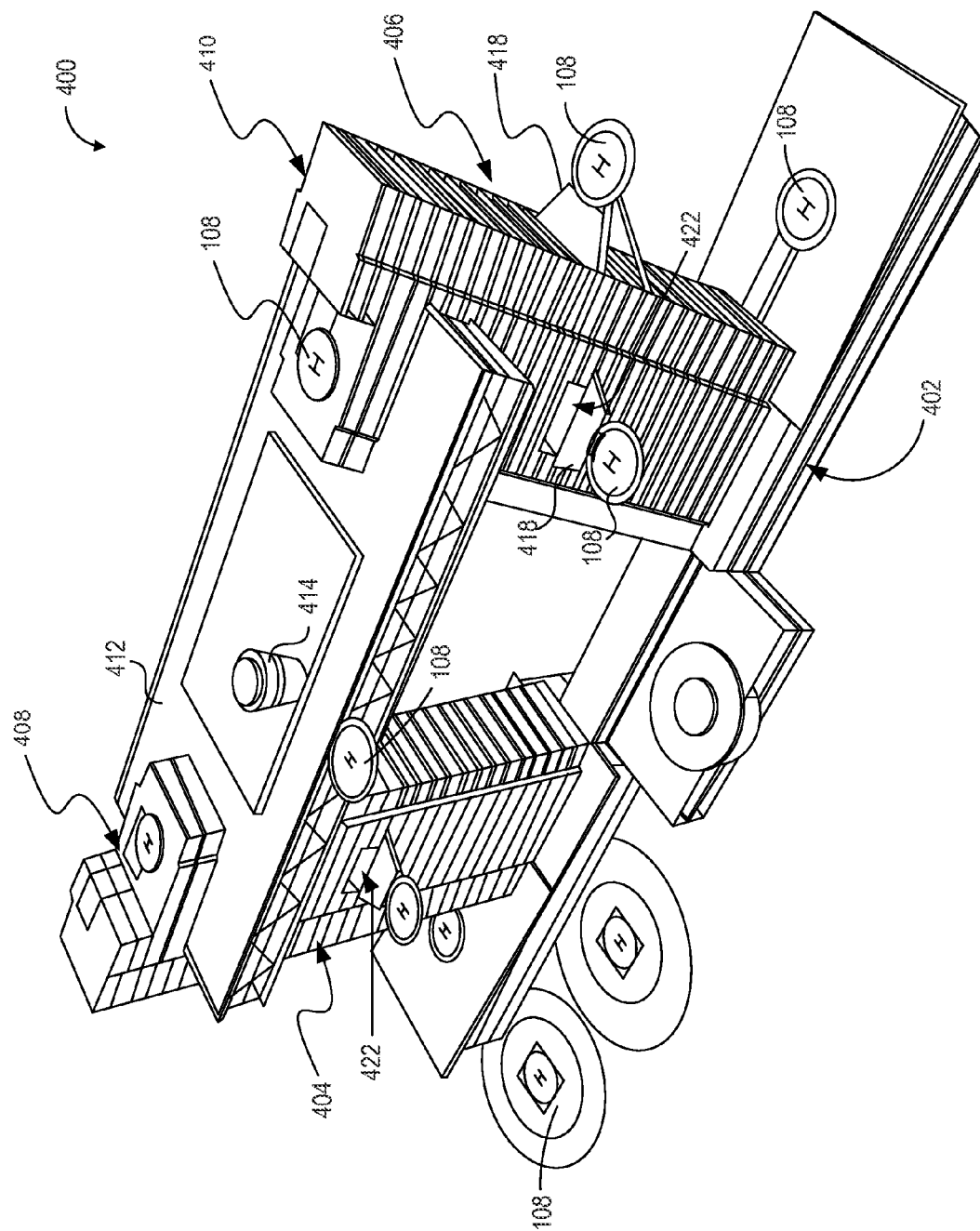
FIG. 13 depicts a perspective view of another embodiment of a heliport of the present technology.
Figure 14:
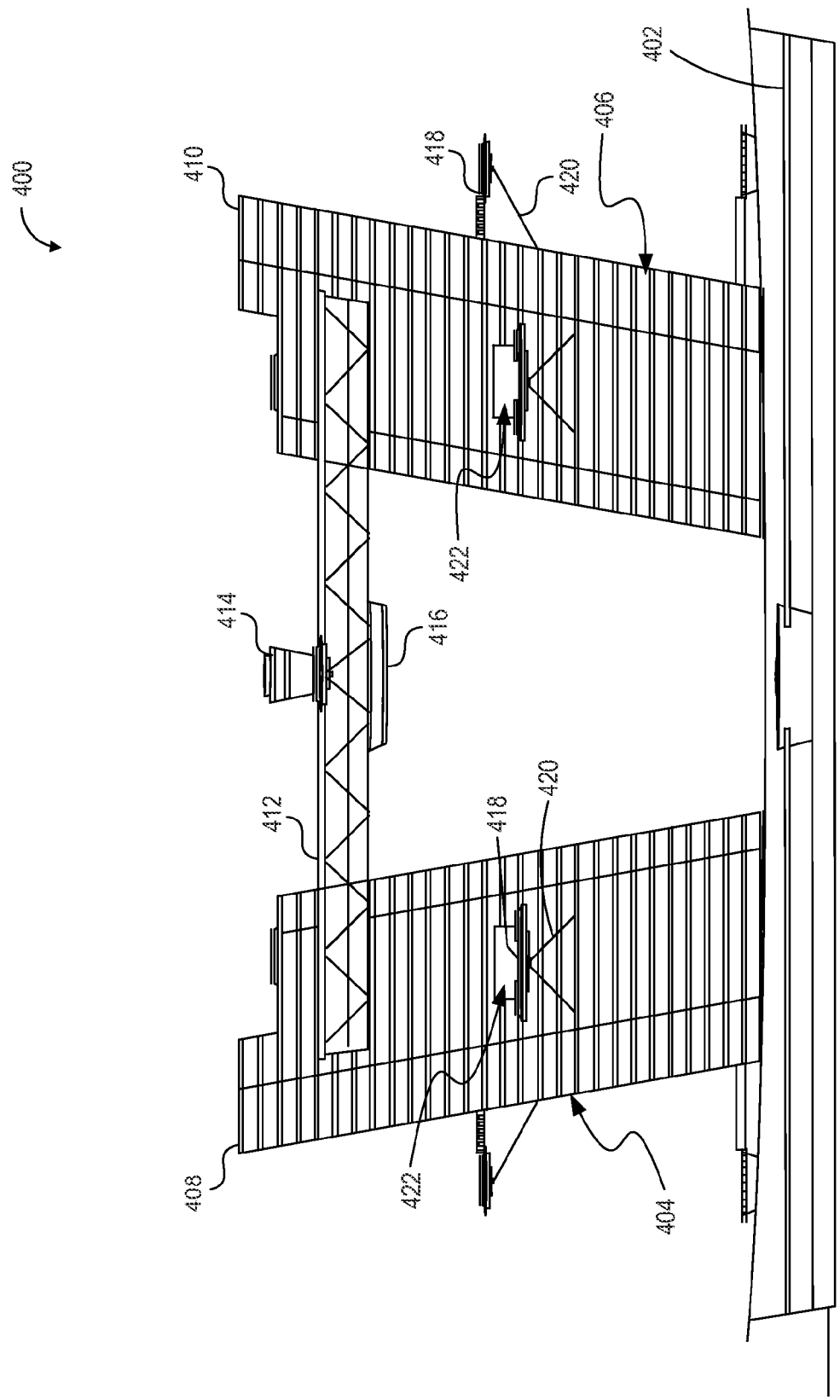
FIG. 14 depicts a front elevation view of the heliport depicted in FIG. 13.
Figure 15:
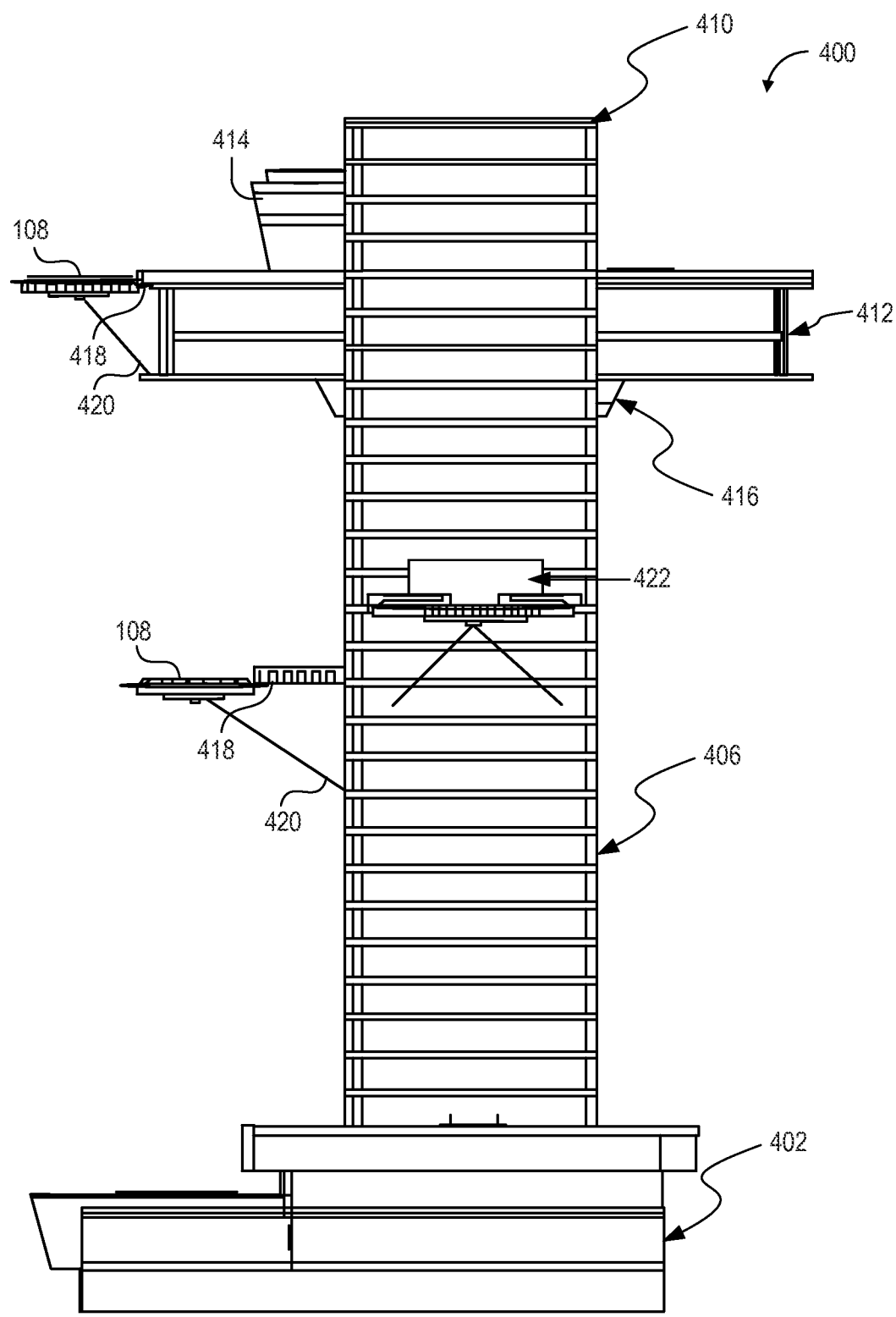
FIG. 15 depicts a side elevation view of the heliport depicted in FIG. 13.
Figure 16:
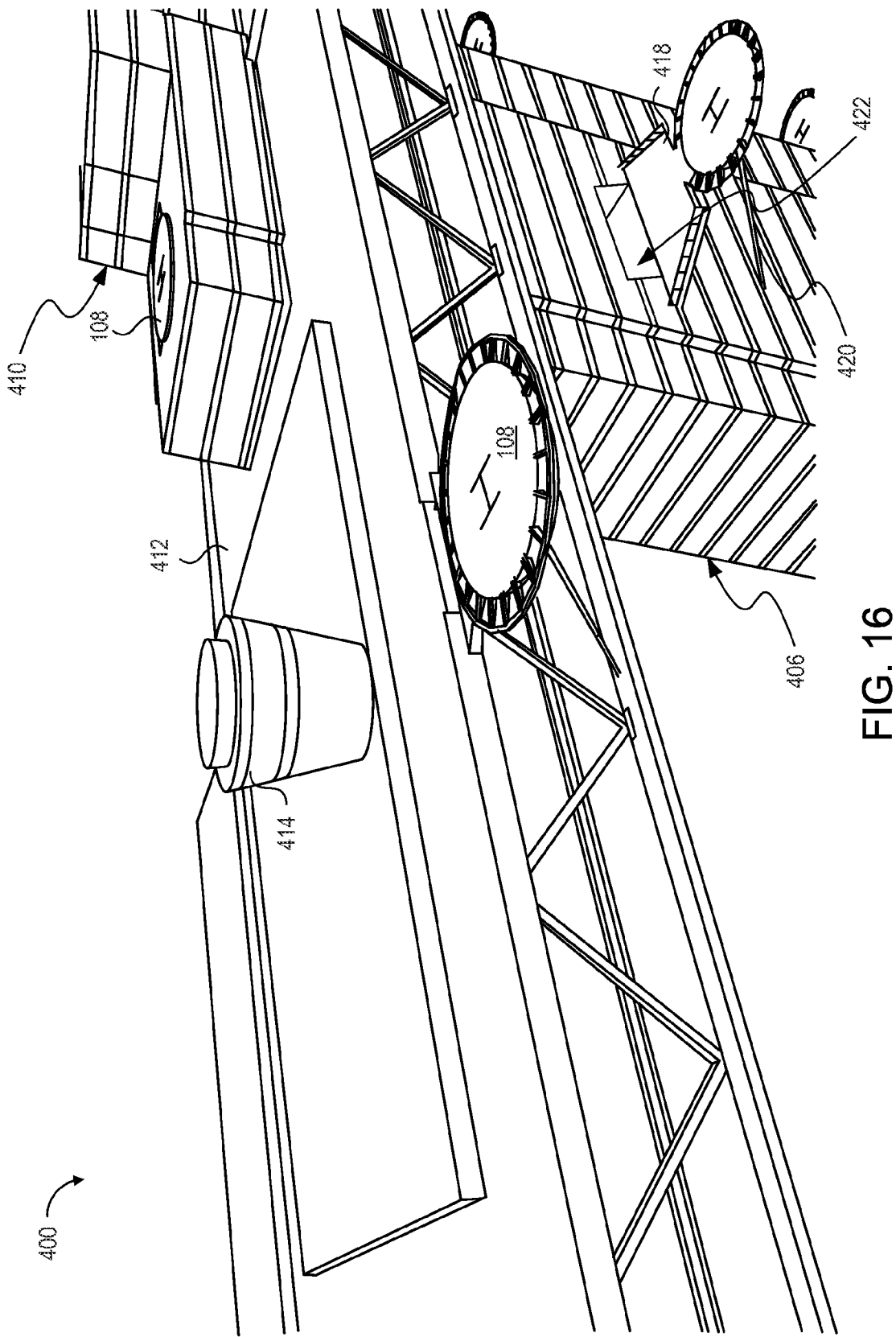
FIG. 16 depicts a partial isometric view of the heliport depicted in FIG. 5.
Figure 17:
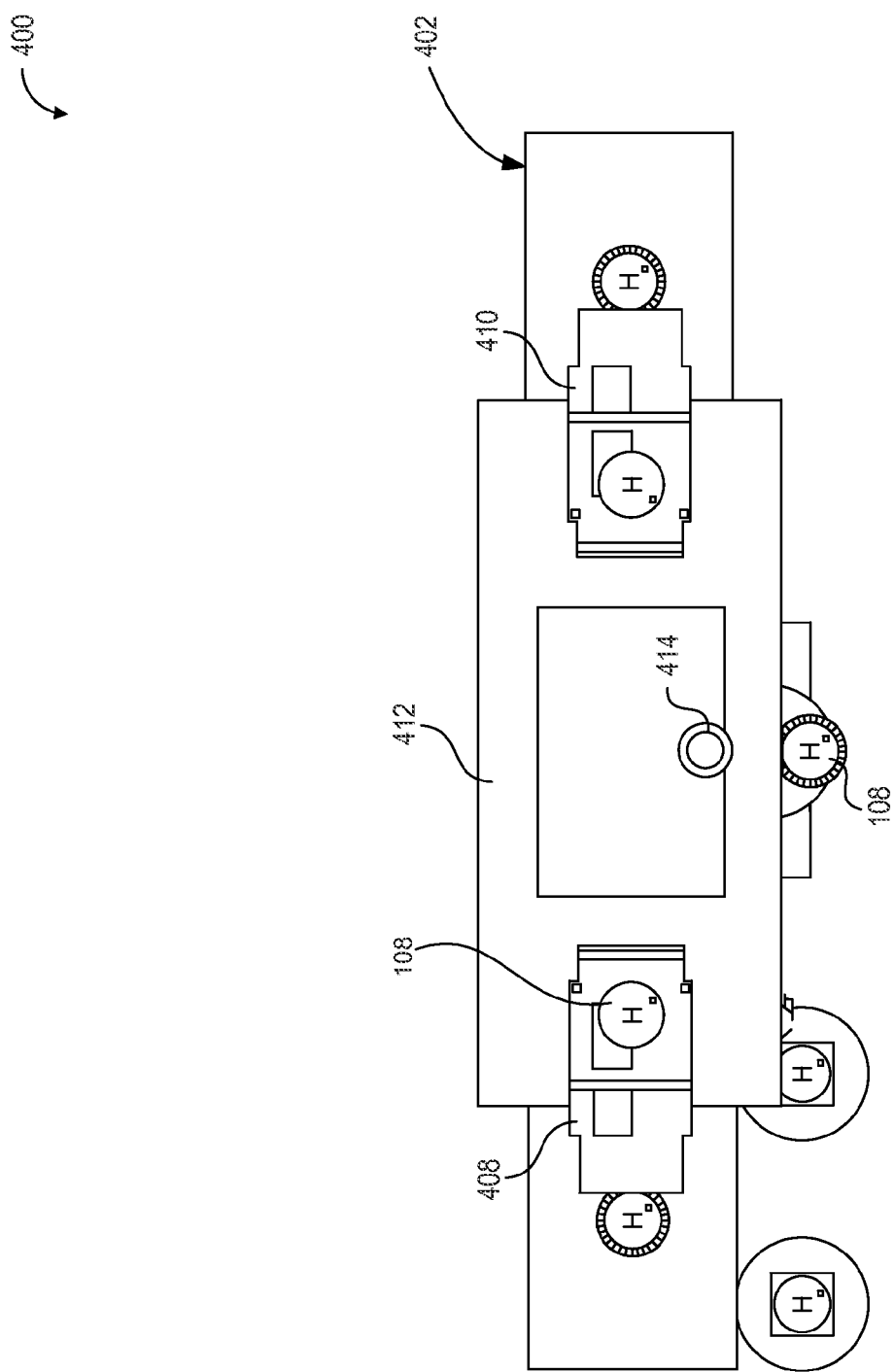
FIG. 17 depicts a top, plan view of the heliport depicted in FIG. 13.

With reference to FIGS. 13-17, another embodiment of the heliport of the present technology is depicted. Specifically, a heliport 400 is provided with a ground level portion 402 that may be provided in a manner similar to that described with respect to ground level portion 102, 202, and 302. Accordingly, the ground level portion 402 may extend above or below the ground surface, nearly any number of desired stories according to the desired usage. It is contemplated that the ground level portion 402 may be used for commercial or residential operations. Other uses may include security, underground parking, and general reception areas.

In the depicted, exemplary embodiment, the heliport 400 may be formed from at least two towers that extend upwardly from opposite end portions of the ground level portion 402. In the depicted embodiment, a first tower 404 and second tower 406 extend upwardly and at a slight angle away from one another. The first tower 404 and second tower 406 are positioned to be spaced apart from one another, closer to one another adjacent the ground level portion 402 and further from one another adjacent the first tower rooftop portion 408 and second tower rooftop portion 410. The size and configuration of the open space between the first tower 404 and the second tower 406 may be provided according to the desired needs of the heliport 400.

The first tower rooftop portion 408 and second tower rooftop portion 410 are depicted as being tiered. It is contemplated, however that the rooftops could each be provided as a single level or with a variety of tiered configurations with multiple levels. It is contemplated that the first tower rooftop portion 408 and second tower rooftop portion 410 will include sufficient open space to include at least one or more helipads 108 thereon. The helipads 108 on either or both of the first tower rooftop portion 408 and second tower rooftop portion 410 may be provided in a manner similar to that described with respect to the helipads 108 in the above-described heliports. Similarly, a railing (not depicted) may extend around the perimeter of both the first tower rooftop portion 408 and second tower rooftop portion 410 to provide safety for personnel conducting operations thereon. In view of the height advantage of the first tower rooftops, a control tower may be provided on either rooftop.

A central platform 412 is coupled at opposite end portions with the first tower 404 and second tower 406, adjacent but below the first tower rooftop portion 408 and second tower rooftop portion 410, spanning the open space between the towers. In various embodiments, a control tower 414 is positioned to extend upwardly from the central platform 412, intermediate the first tower rooftop portion 408 and second tower rooftop portion 410. It is contemplated, however, that some embodiments may position the control tower 414 to extend upwardly from either of the first tower rooftop portion 408 or second tower rooftop portion 410. The control tower 414 will perform similar functions as those described above for the other control towers. Accordingly, the control tower 414 will be provided with similar systems and equipment for monitoring heliport control, ground control and local control or air control. As described with respect to previous control towers, the control tower 414 may be provided in many sizes and configurations. However, the circular configuration depicted provides 360 degree views and provides a sufficient height above the central platform 412 to provide the needed aircraft control services. A lower surface of the central platform 412, which borders the open space between the first tower 404 and second tower 406, includes an observation platform 416. The observation platform 416 may be provided in many sizes and configurations. However, the circular configuration depicted provides 360 degree views, which may be used to provide supplemental or primary aircraft control services. In other embodiments, the views afforded by the observation platform 416, from within the open space, may provide a multitude commercial and residential uses for the observation platform 416.

With reference to FIGS. 13-17, the heliport 400 may be provided with a plurality of platforms 418 that cantilever outwardly from side portions of the first tower 404 and/or second tower 406. These side portions of the building may extend between the ground level 402 and the first tower rooftop portion 408 or second tower rooftop portion 410. It is contemplated that each platform 418 will include at least one helipad 108, as described previously herein. A walkway having a width of at least 20 feet may extend outwardly from the FATO of each helipad 108 to allow individuals and equipment to move around the helipad 108. A railing not depicted may extend upwardly from the edge portions of the platform 418 and extend around the entire peripheral edge of the platform 418. Distal end portions of the platforms 418 may be coupled with one or more supports 420 that are coupled, at opposite end portions, with the first tower 404 or second tower 406, beneath the platform 418. The size, number and configuration of the supports 420 will be dictated by the configuration and intended use of the associated platform 418. Other helipads 108 may be positioned on or adjacent the ground level 402, as depicted.

Hangars 422 may be associated with each platform 418. The hangars 422 may be outfitted similar to hangars described hereinabove. In this manner, aircraft may be moved from a platform 418 into a hangar 422 and returned for takeoff. Within the hangars, service and maintenance of the aircraft may be performed and aircraft may be stored for short term or long term operations. The hangars 422 may also be provided to have a ceiling height that is multiple stories high and may provide open sides that may be selectively closable with at least one retractable cover, such as retractable doors, windows, and the like.

Figure 18:
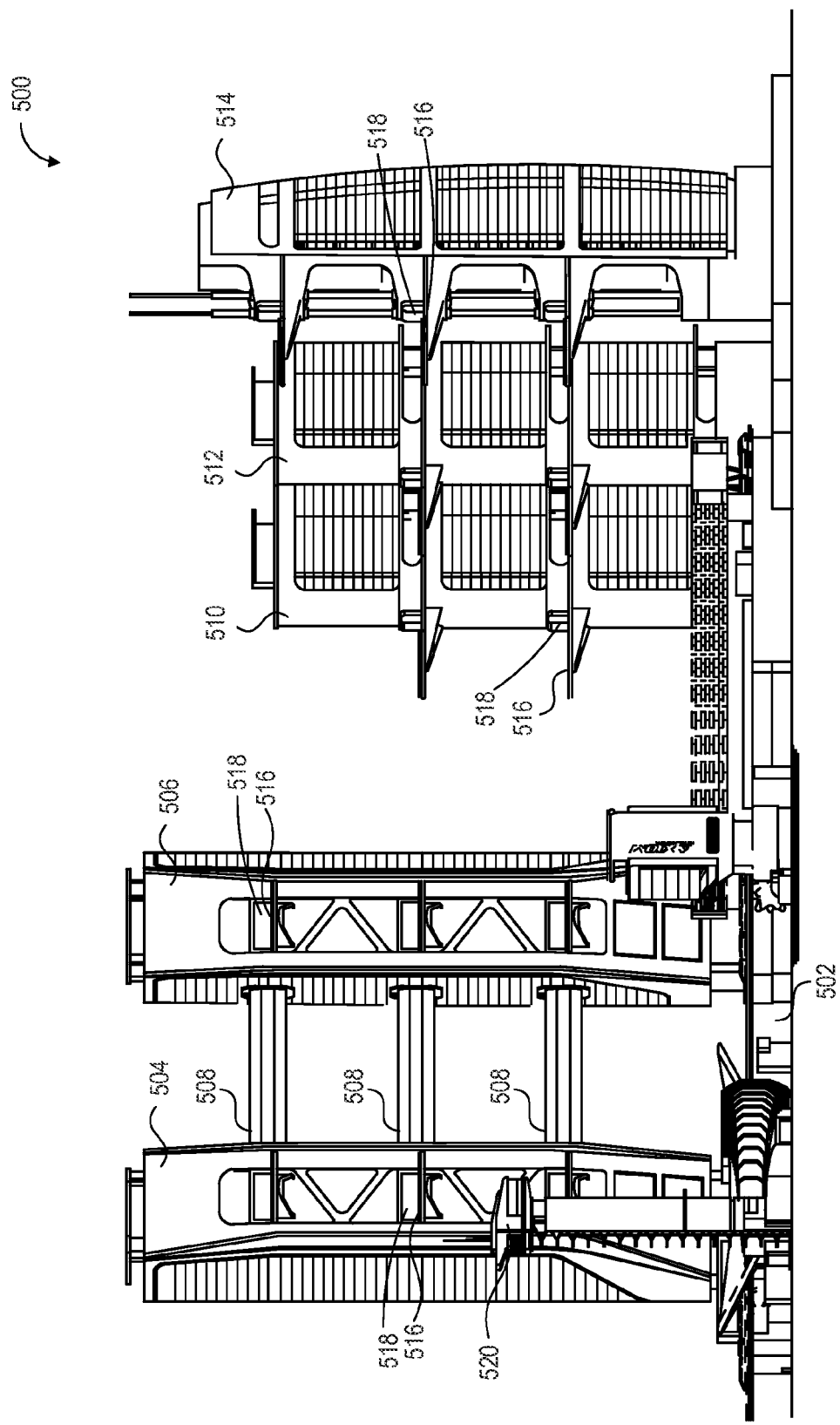
FIG. 18 depicts a front elevation view of another embodiment of the heliport of the present technology.
Figure 19:
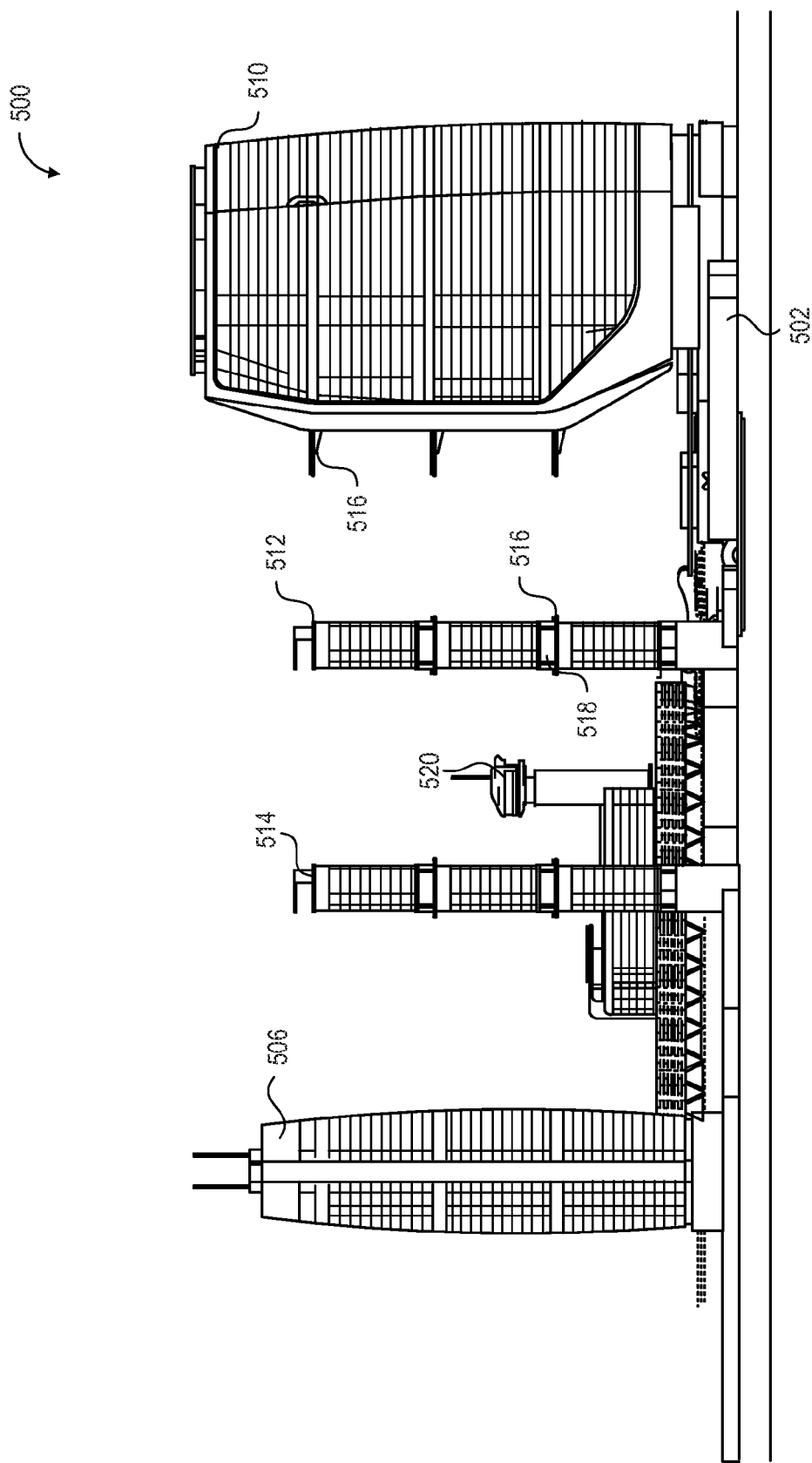
FIG. 19 depicts a side elevation view of the heliport depicted in FIG. 18.
Figure 20:
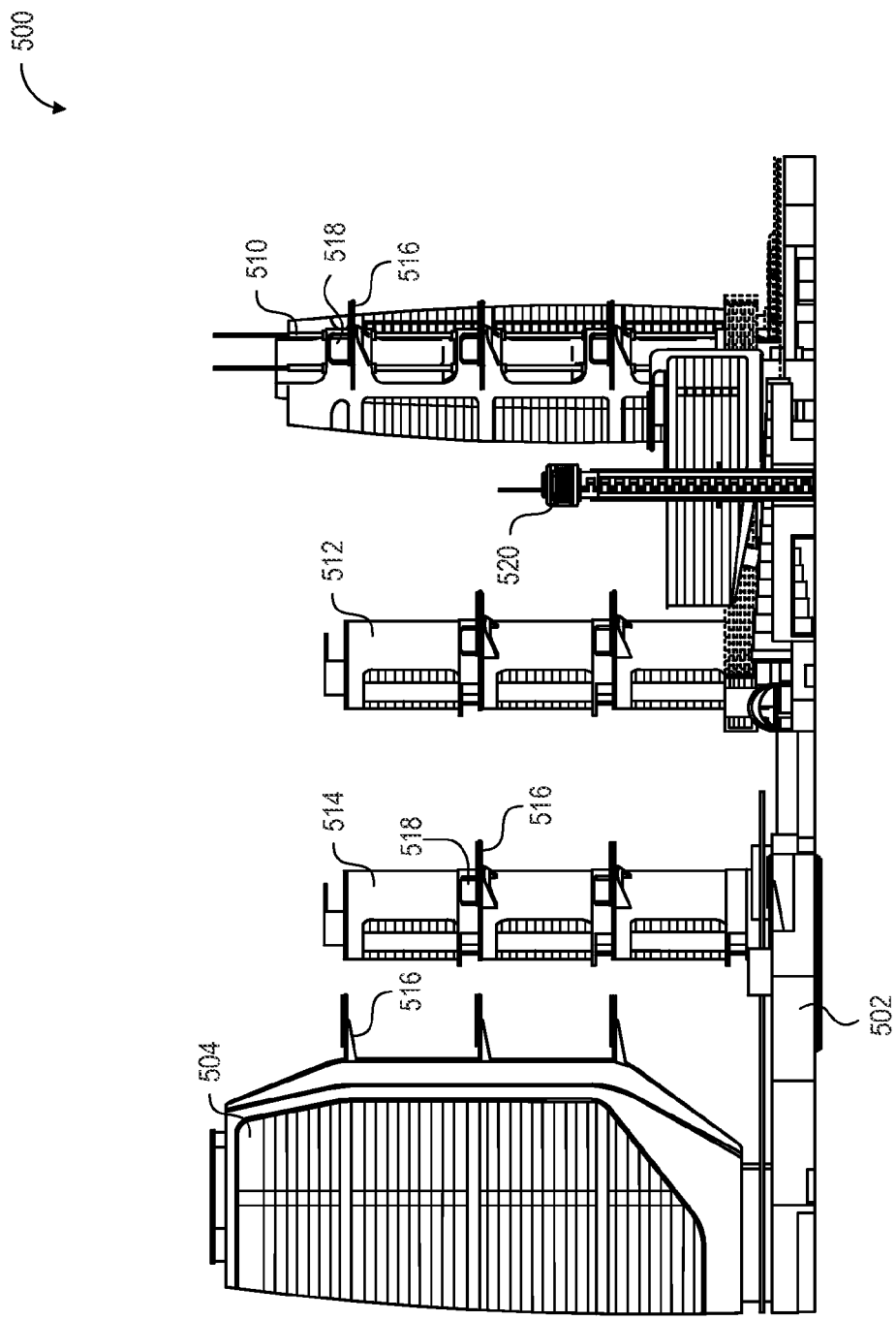
FIG. 20 depicts another side elevation view of the heliport depicted in FIG. 18, as viewed from the opposite side depicted in FIG. 19.
Figure 21:
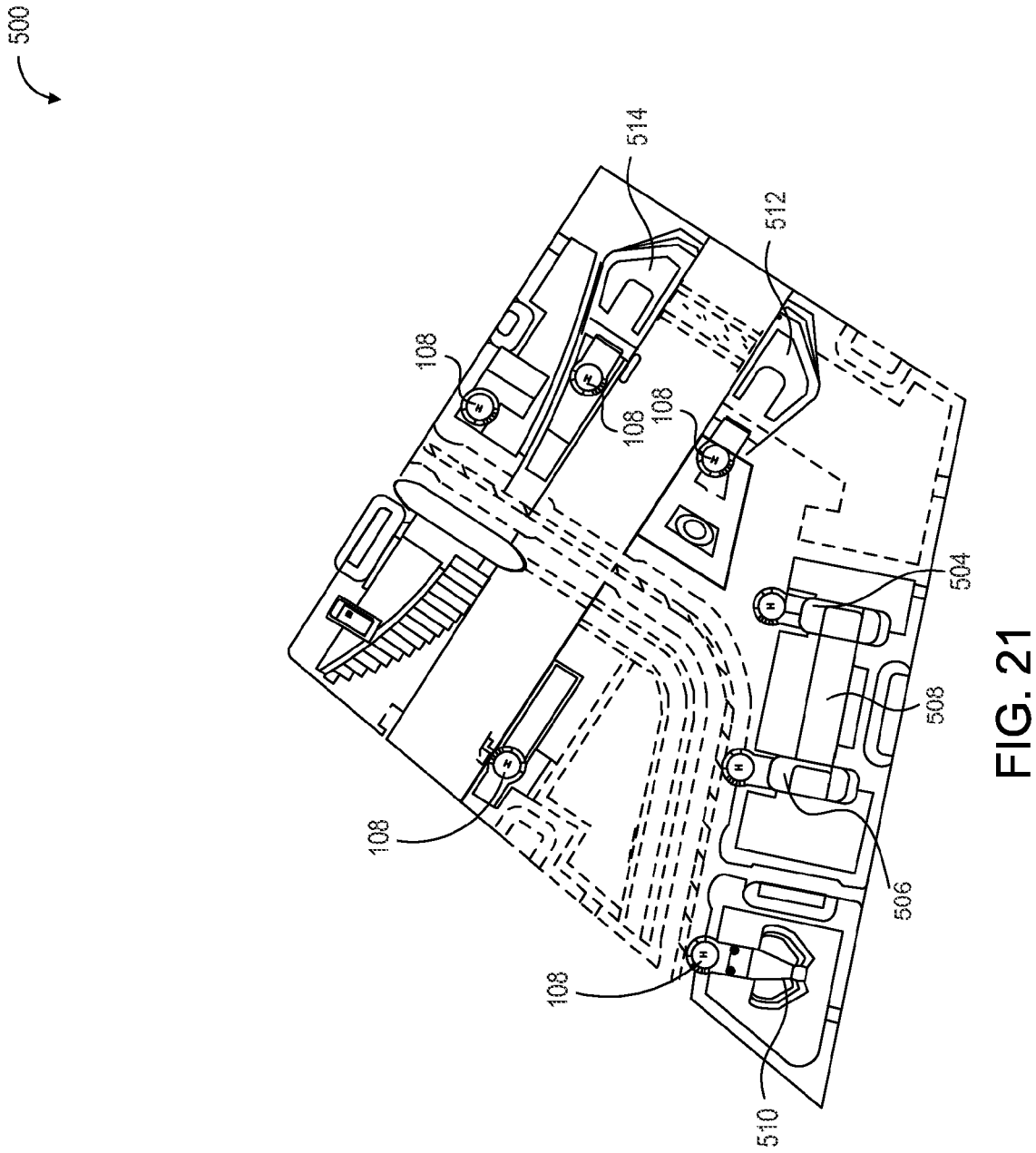
FIG. 21 depicts a top, plan view of the heliport depicted in FIG. 18.

With reference to FIGS. 18-21, a further embodiment of the heliport of the present technology is depicted. Specifically, a heliport 500 is provided with a ground level portion 502 that may be provided in a manner similar to that described with respect to other ground level portions herein. Accordingly, the ground level portion 502 may extend above or below the ground surface, nearly any number of desired stories according to the desired usage. It is contemplated that the ground level portion 502 may be used for commercial or residential operations. Other uses may include public transportation (rail, automotive, or otherwise) facilities, security, underground parking, and general reception areas.

In the depicted, exemplary embodiment, the heliport 500 is formed from a plurality of horizontally spaced-apart towers that extend upwardly from the ground level portion 502. In the depicted embodiment, a first tower 504 and second tower 506 are positioned in close proximity with one another. A plurality of platforms 508 that span the open space between the first tower 504 and the second tower 506. Each of the platforms 508 that extend between the first tower 504 and second tower 506 will have a length and width that will vary depending upon their intended use. For example, smaller platforms 508, of open or closed design, may be provided for pedestrian foot-traffic between the first tower 504 and the second tower 506. Larger, open platforms 508 may be provided to support one or more helipads that are structured and accessorized according to the helipads 108 described previously herein. In the depicted embodiment, the heliport 500 includes a third tower 510, fourth tower 512, and fifth tower 514 that each extend upwardly from the ground level portion 502. The towers are shown to be separate from one another above the ground level portion 502. It is contemplated, however, that one or more platforms may be provided to couple the towers with one another above the ground level portion 508 in a manner similar to that described with respect to platforms 508.

With continued reference to FIGS. 18-21, embodiments of the heliport 500 may provide one or more platforms 516 that cantilever outwardly from side portions of any of the towers. The side portions of the towers may extend between the ground level 502 and tower rooftop portions associated with any of the individual towers. It is contemplated that each platform 516 will include at least one helipad 108, as described previously herein. A walkway having a width of at least 20 feet may extend outwardly from the FATO of each helipad 108 to allow individuals and equipment to move around the helipad 108. A railing not depicted may extend upwardly from the edge portions of the platform 516 and extend around the entire peripheral edge of the platform 516. Distal end portions of the platforms 516 may extend freely from the side portions of the towers (as depicted) or include one or more supports that are coupled, at opposite end portions, with the side portions of the towers, beneath the platform 516. Other helipads 108 may be positioned on or adjacent the ground level portion 502, as depicted.

Hangars 518 may be associated with each platform 516. The hangars 518 may be outfitted similar to hangars described hereinabove. In this manner, aircraft may be moved from a platform 516 into a hangar 518 and returned for takeoff. Within the hangars, service and maintenance of the aircraft may be performed and aircraft may be stored for short term or long term operations. The hangars 518 may also be provided to have a ceiling height that is multiple stories high and may provide open sides that may be selectively closable with at least one retractable cover, such as retractable doors, windows, and the like.

In various embodiments, a control tower 520 is positioned to extend upwardly from the ground level portion 502. It is contemplated, however, that some embodiments may position the control tower 520 to extend upwardly from one of any of the tower rooftop portions. The control tower 520 will perform similar functions as those described above for the other control towers. Accordingly, the control tower 520 will be provided with similar systems and equipment for monitoring heliport control, ground control and local control or air control. As described with respect to previous control towers, the control tower 520 may be provided in many sizes and configurations.

Although the technology been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

The invention claimed is:

1. A heliport comprising:
a building having a ground level portion, a roof level portion, and a plurality side portions that extend between the ground level portion and the roof level portion;
the building includes a plurality of towers that extend upwardly from the ground level portion and are horizontally spaced-apart from one another by a distance that defines an open space between the plurality of towers; the plurality of towers each including a roof level portion, and a plurality side portions that extend between the ground level portion and the roof level portion;
a first helipad platform extending outwardly from a side portion of at least two towers of the plurality of towers of the building; the first helipad platform including opposite end portions, opposite side portions, and at least one helipad defined by a set of helipad markings;
the helipad platform extending between side portions of at least two towers of the plurality of towers, spanning the open space between the at least two towers of the plurality of towers, such that the side portions of the at least two of the plurality of towers extend upwardly from the opposite end portions of the helipad platform; the helipad positioned intermediate the opposite end portions of the helipad platform such that the helipad is suspended between and not atop either or both of the at least two towers of the plurality of towers; the helipad platform being positioned with respect to the building in a manner that allows the landing and take-off of vertical takeoff and landing aircraft from the helipad; and
a second helipad platform extending outwardly from a side portion of the building; the second helipad platform including opposite end portions, opposite side portions, and at least one helipad defined by a set of helipad markings; the first helipad platform and second helipad platform being vertically aligned with one another in a spaced-apart relationship.

2. The heliport of claim 1 further comprising:
an aircraft hangar extending into a side portion of at least one of the plurality of towers from a hangar opening formed in the side portion of the at least one of the plurality of towers; the aircraft hangar being aligned with an end portion of the first helipad platform.

3. The heliport of claim 2 wherein:
the aircraft hangar includes at least one retractable cover, such that the hangar opening may be selectively opened and closed.

4. The heliport of claim 1 further comprising:
a plurality of helipad platforms that are each coupled at opposite end portions with at least two of the plurality of towers, spanning the open space between the at least two towers; each of the plurality of helipad platforms being vertically spaced-apart from adjacent helipad platforms of the plurality of helipad platforms at different distances from the ground level portion.

5. The heliport of claim 4 wherein:
at least one helipad platform of the plurality of helipad platforms being vertically aligned with another helipad platform of the plurality of helipad platforms.

6. The heliport of claim 1 wherein:
the roof level portion of one of the plurality of towers being positioned at a first distance from the ground level portion; a roof level portion of another one of the plurality of towers being positioned at a second distance from the ground level portion; the first distance from the ground level portion being greater than the second distance from the ground level portion.

7. The heliport of claim 6 wherein:
a third helipad platform extends between a side portion of one of the plurality of towers to a roof level portion of another one of the plurality of towers.

8. The heliport of claim 1 wherein:
a third helipad platform, having a proximal end portion, a free distal end portion, a length that extends between the proximal end portion and the free distal end portion, and a helipad defined by a set of helipad markings; the second helipad platform cantilevering outwardly, at the proximal end portion of the second helipad platform, from a side portion of one tower of the plurality of towers, lower than a roof level portion of the building, toward the free distal end portion of the second helipad platform, such that a more than half of the length of the second helipad platform, from the free distal end portion toward the proximal end portion freely cantilevers from the one tower of the plurality of towers.

* * * * *